US009501065B2

(12) United States Patent
Boyd

(10) Patent No.: US 9,501,065 B2
(45) Date of Patent: Nov. 22, 2016

(54) DISPLAYS FOR, AND CONTROLLER WITH DISPLAYS FOR AIR MATTRESSES

(71) Applicant: Dennis M. Boyd, St. Louis, MO (US)

(72) Inventor: Dennis M. Boyd, St. Louis, MO (US)

( * ) Notice: Subject to any disclaimer, the term of this patent is extended or adjusted under 35 U.S.C. 154(b) by 563 days.

(21) Appl. No.: 14/037,070

(22) Filed: Sep. 25, 2013

(65) Prior Publication Data

US 2015/0082548 A1    Mar. 26, 2015

(51) Int. Cl.
*G08B 21/00* (2006.01)
*G05D 16/20* (2006.01)
*G05D 7/06* (2006.01)
*A47C 27/08* (2006.01)
*A47C 31/00* (2006.01)

(52) U.S. Cl.
CPC ......... *G05D 16/2006* (2013.01); *A47C 27/082* (2013.01); *A47C 27/083* (2013.01); *A47C 31/008* (2013.01); *G05D 7/0617* (2013.01)

(58) Field of Classification Search
CPC .. A47C 27/10; A47C 27/082; A47C 27/081; A47C 27/083; A47C 31/008; G05D 7/0617
USPC ......................................................... 340/626
See application file for complete search history.

(56) References Cited

U.S. PATENT DOCUMENTS

| 4,024,531 | A | * | 5/1977 | Ashby | ..................... G06F 3/023 345/59 |
| 5,995,070 | A | * | 11/1999 | Kitada | ..................... G09G 3/32 345/83 |
| 2007/0238935 | A1 | * | 10/2007 | Boyd | ................... A47C 31/123 600/300 |
| 2008/0259241 | A1 | * | 10/2008 | Morimoto | ......... G02F 1/133603 349/62 |
| 2013/0342132 | A1 | * | 12/2013 | Jorgensen | .............. H05B 37/02 315/297 |

* cited by examiner

*Primary Examiner* — Kerri McNally
(74) *Attorney, Agent, or Firm* — Harness, Dickey & Pierce, P.L.C.

(57) ABSTRACT

A display for displaying the condition of an air mattress. The display comprises a plurality of arrays of elements organized in a hierarchy. Each element represents a pressure increment. Each array comprises a plurality of rows and a plurality columns. The elements in each row of an array being distinctive in appearance from the elements in the other rows of the array. A control that operates the elements to indicate the pressure beginning with the first column, of the first row, of the lowest array in the hierarchy.

14 Claims, 26 Drawing Sheets

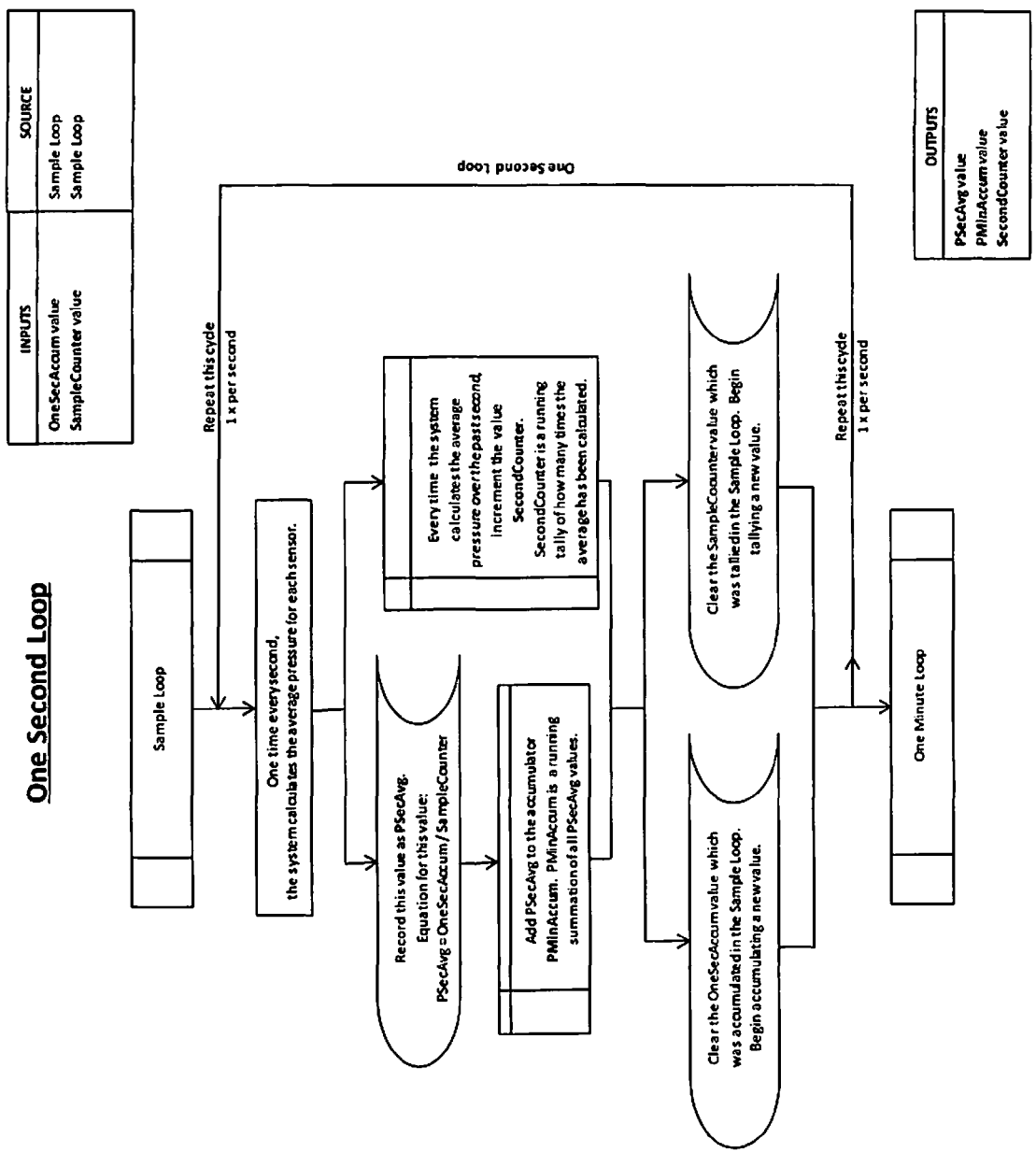

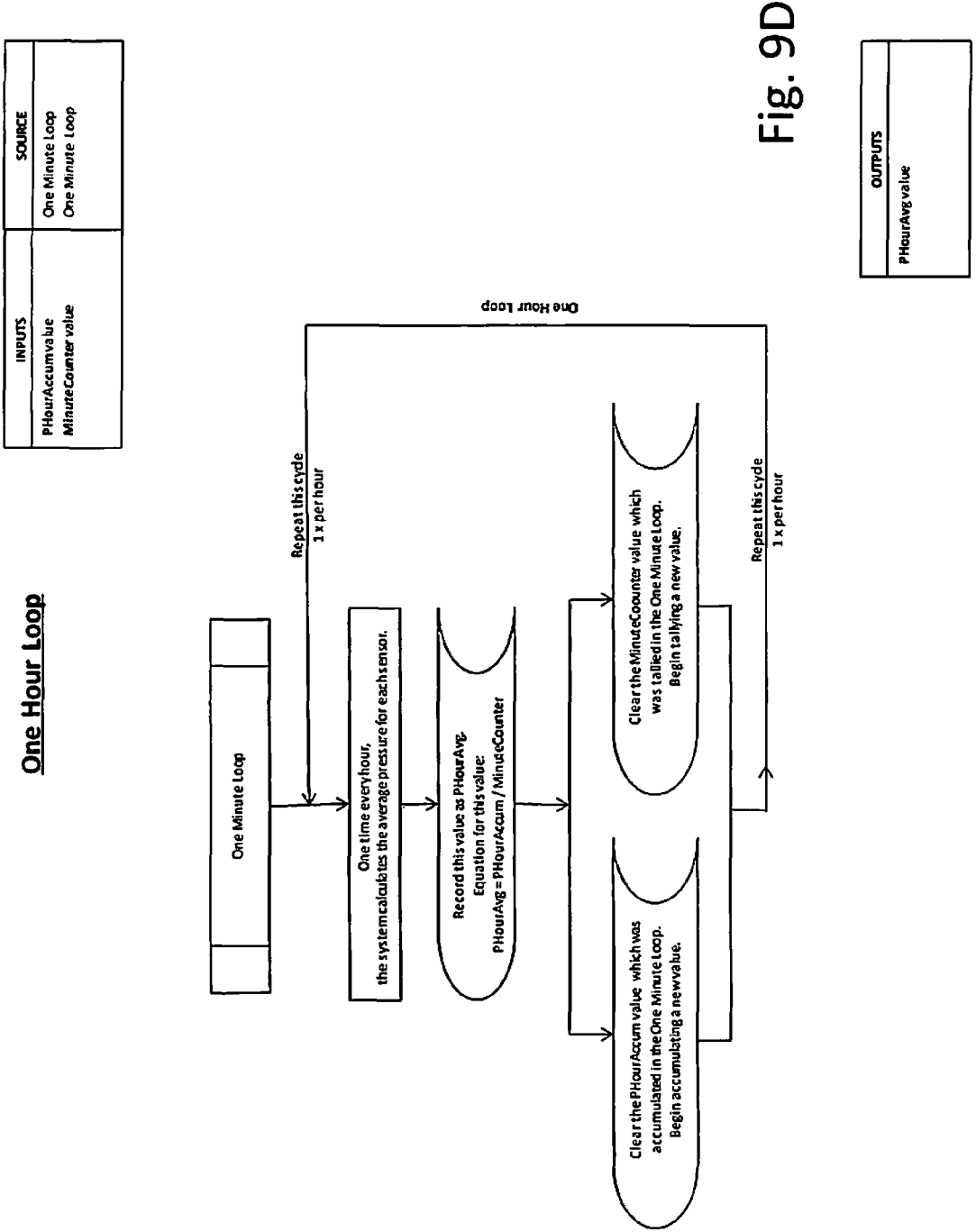

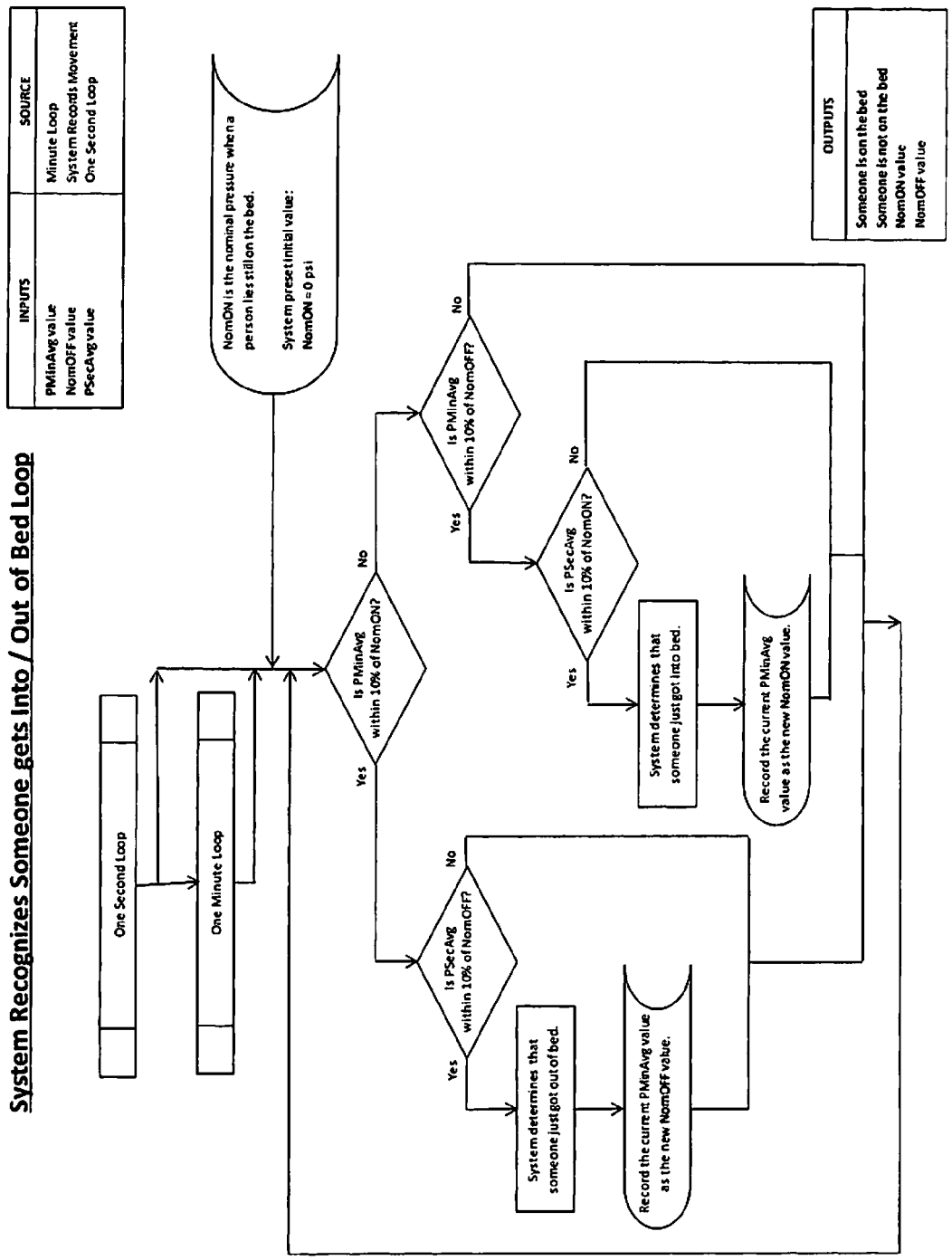

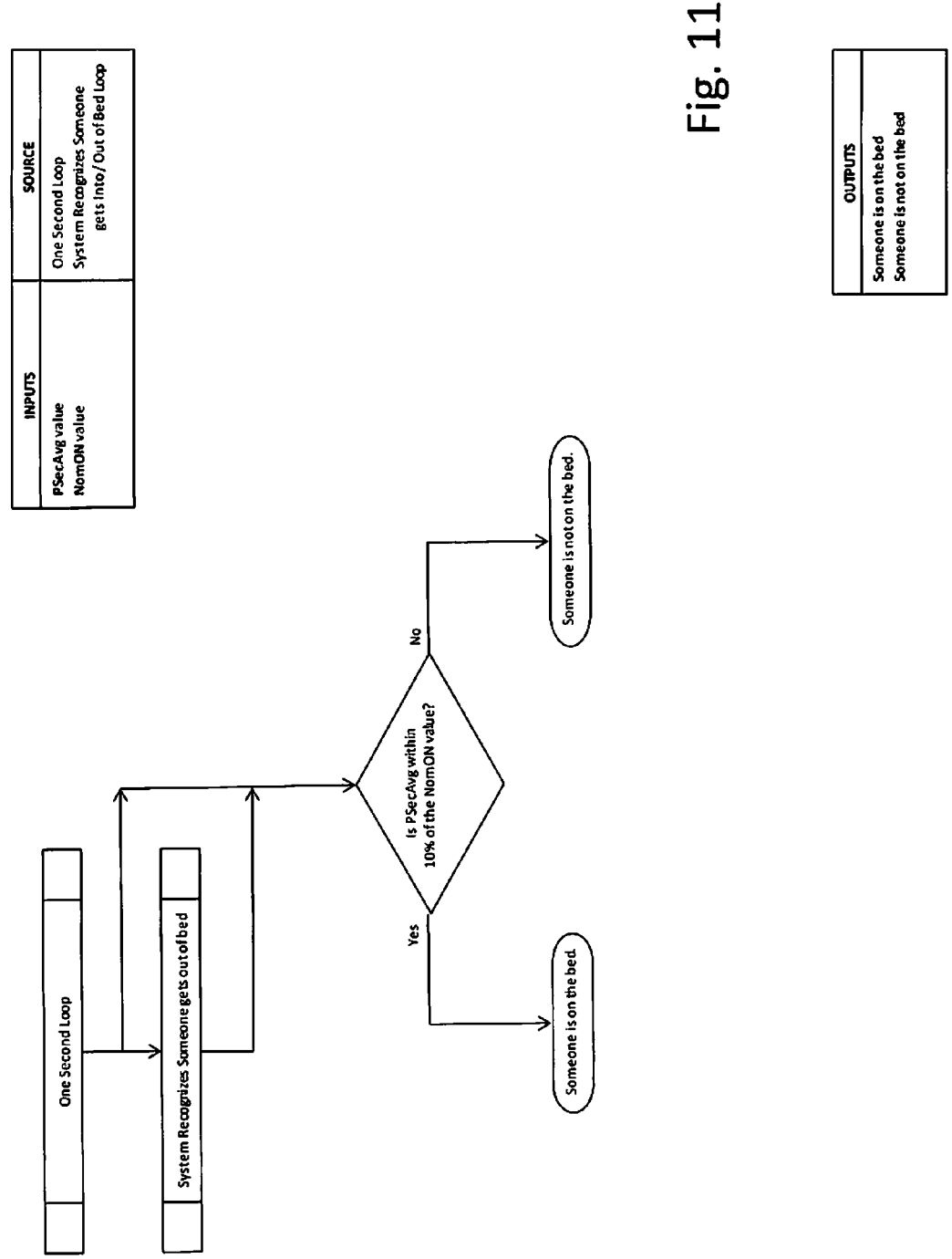

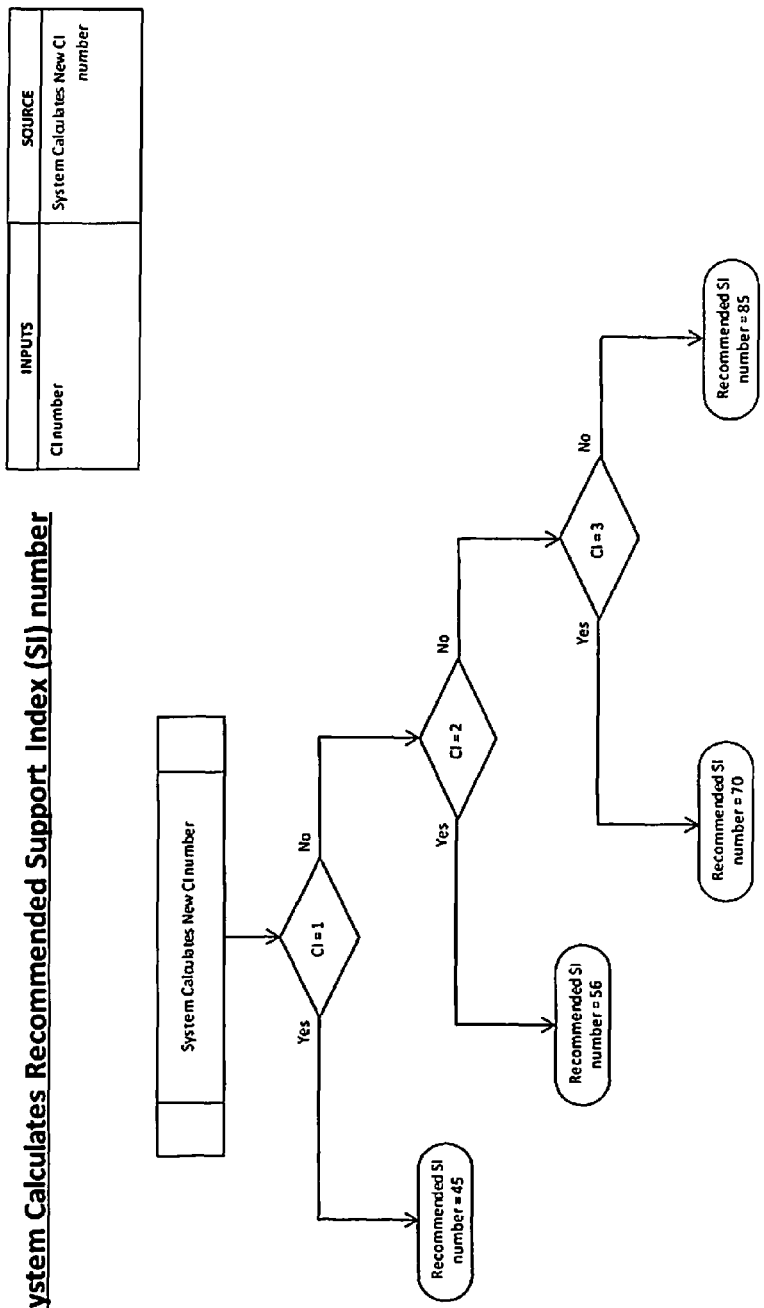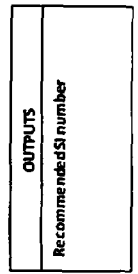

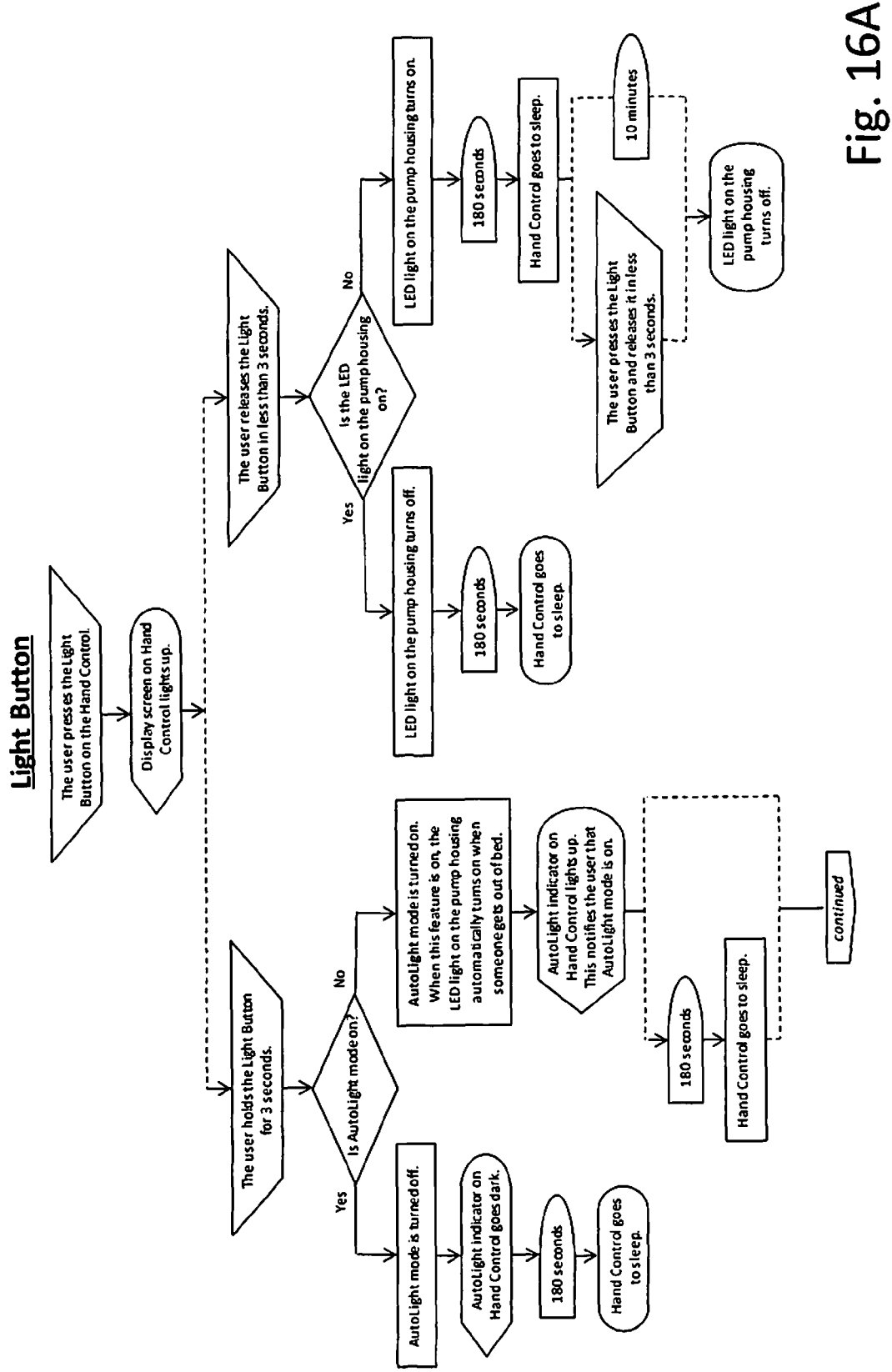

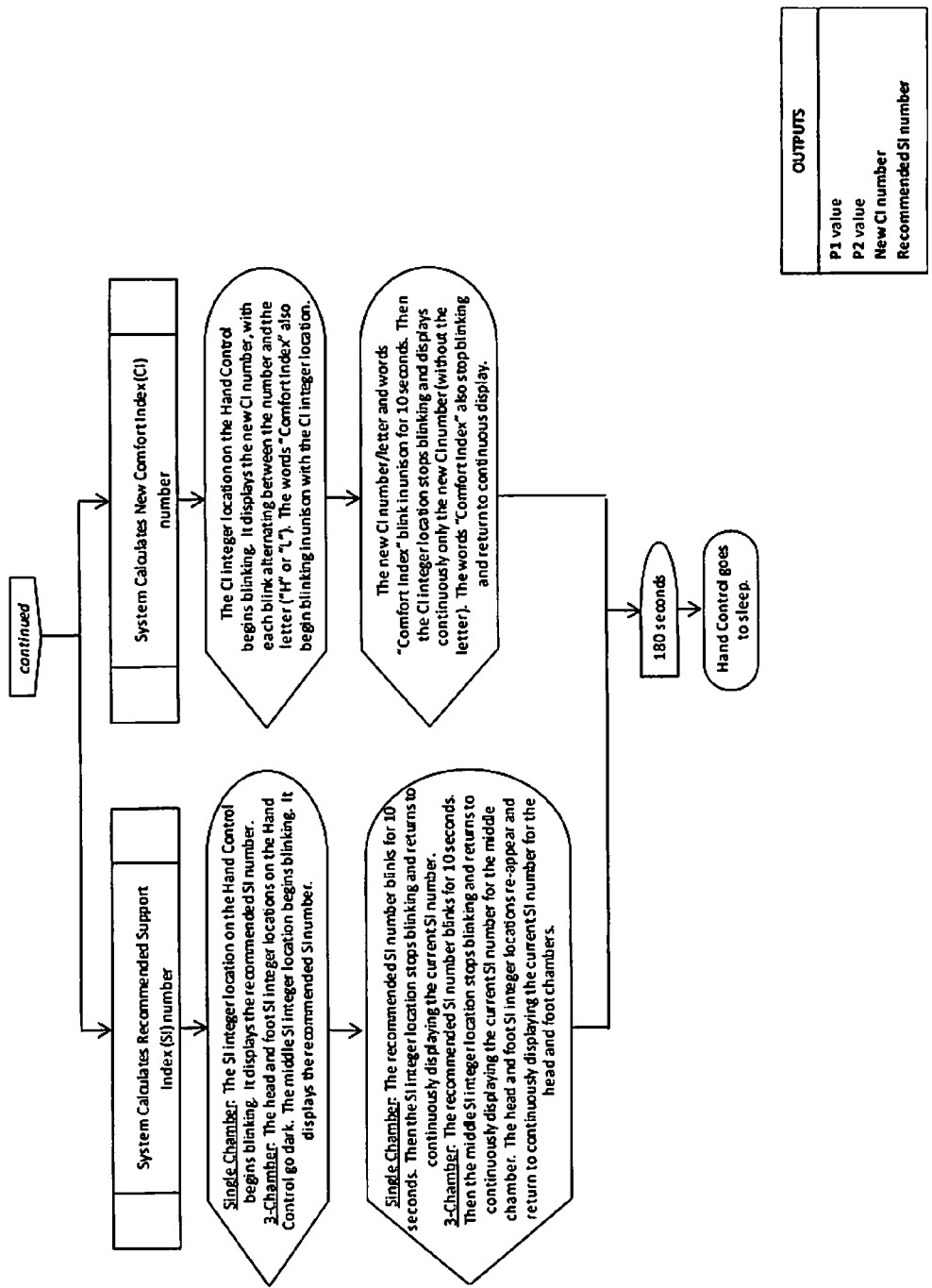

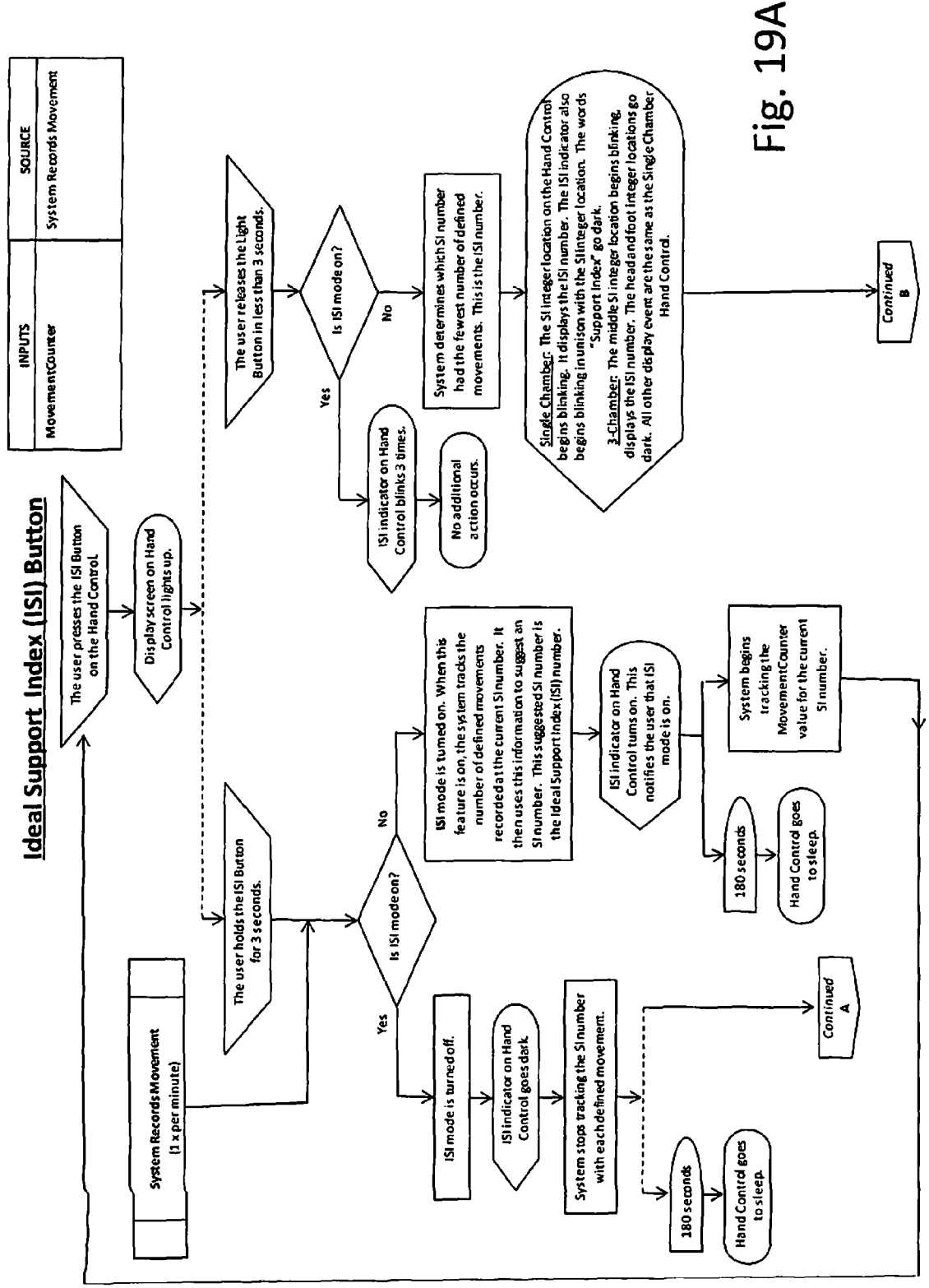

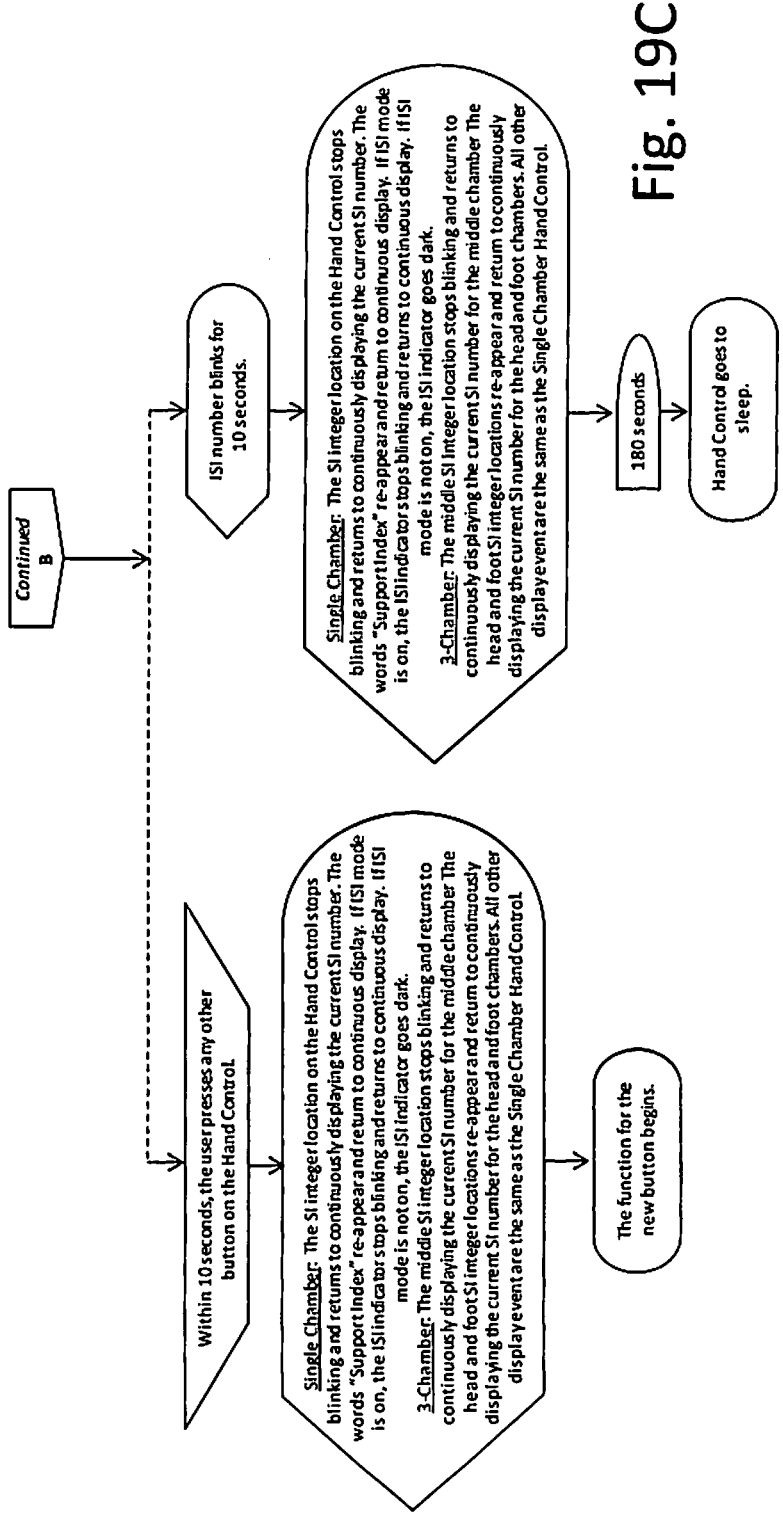

DISPLAYS FOR, AND CONTROLLER WITH DISPLAYS FOR AIR MATTRESSES

FIELD

The present disclosure relates to displays for, and controllers with displays for, air cushions, such as air mattresses.

BACKGROUND

This section provides background information related to the present disclosure which is not necessarily prior art.

Air cushions, such as air mattresses, are increasingly popular because they are light weight and comfortable, and easy to adjust by adjusting the internal pressure. However, while the pressure is easy to control by adding and subtracting air, it is often difficult for users to understand how a particular level of pressure relates to the comfort or "feel" of the mattress.

SUMMARY

This section provides a general summary of the disclosure, and is not a comprehensive disclosure of its full scope or all of its features.

Embodiments of the present invention provide an improved display for use with air cushions, such as air mattresses, and controllers with an improved display for use with air cushions, such as air mattresses.

A preferred embodiment of a display according to the principles of this invention comprises a plurality of arrays of elements organized in a hierarchy. Each of the elements represents a pressure increment. Each array comprises a plurality of rows of a plurality of elements, preferably arranged in columns. The elements in each array are preferably distinctive in appearance from the elements in the other arrays, and more preferably the elements in each row of an array are distinctive in appearance from the elements in the other rows of the array. A control operates the elements to indicate the pressure by activating the unactivated element in the lowest row of the lowest array, and deactivating the activated element in the highest row of the highest array.

The display preferably further comprises a pressure display that displays a numerical value corresponding to the value displayed by the elements. The elements of each array preferably have a unique color, and the numerical value is displayed in the same color as the highest array in the hierarchy which has an activated element.

The display preferably also includes a level display that displays an alphanumeric character corresponding to the highest array in the hierarchy which has an activated element, and this value is preferably displayed in the same color as the highest array in the hierarchy which has an activated element.

Each of the arrays of the display is preferably assigned a descriptive name, and the display preferably includes a name display showing displays the descriptive name corresponding to the highest array in the hierarchy which has an activated element, and this name is preferably displayed in the same color as the highest array in the hierarchy which has an activated element.

In the preferred embodiment there are four arrays, of twenty-five elements each. Each array is preferable arranged in five rows of five columns. The color of the elements in each successive row of an array is more intense than the previous row.

According to another embodiment, a controller is provided for controlling the pressure in an air cushion, such as an air mattress. The preferred embodiment of this controller preferably comprises a plurality of controls for operating a pressure system to change the pressure in the air mattress, and at least one display in accordance with this disclose.

The controller can be adapted for controlling the pressure in each of the chambers of a multi-chamber air mattress. The controller preferably comprises at least one control for operating a pressure system to change the pressure in each of the chambers of the multi-chamber air mattress, and a display in accordance with this disclosure for each of the chambers of the multi-chamber.

In an alternate embodiment, the controller can comprise a selector for selecting one of the chambers of the multi-chamber air mattress to control, controls for operating a pressure system to change the pressure the selected chamber of the multi-chamber air mattress, and a display in accordance with this disclosure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 9A-9D are flow charts of the logic for the pressure sampling by the sensors for use with the displays and controllers of the various embodiments of this invention;

FIG. 10 is a flow chart of the logic for determining when someone gets into or out of the bed for use with the displays and controllers of the various embodiments of this invention;

FIG. 11 is a flow chart of the logic for determining when someone is on the bed for use with the displays and controllers of the various embodiments of this invention;

FIG. 14 is a flow chart of the logic for determining a recommended support index for use with the displays and controllers of the various embodiments of this invention;

FIGS. 16A-B are flow charts of the logic for operating the light button on some controllers of the various embodiments of this invention;

Figure 18A:
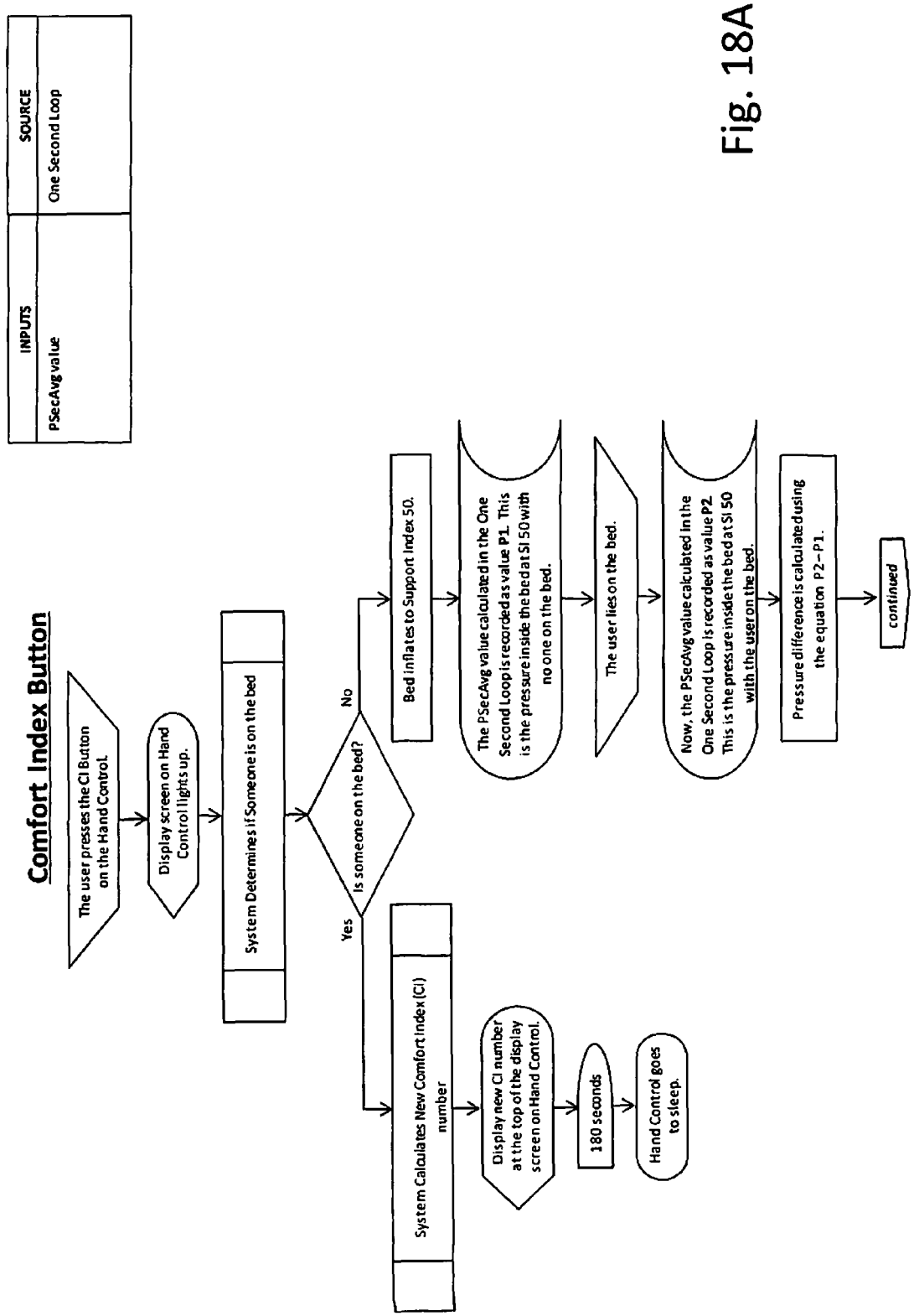
Figure 19B:
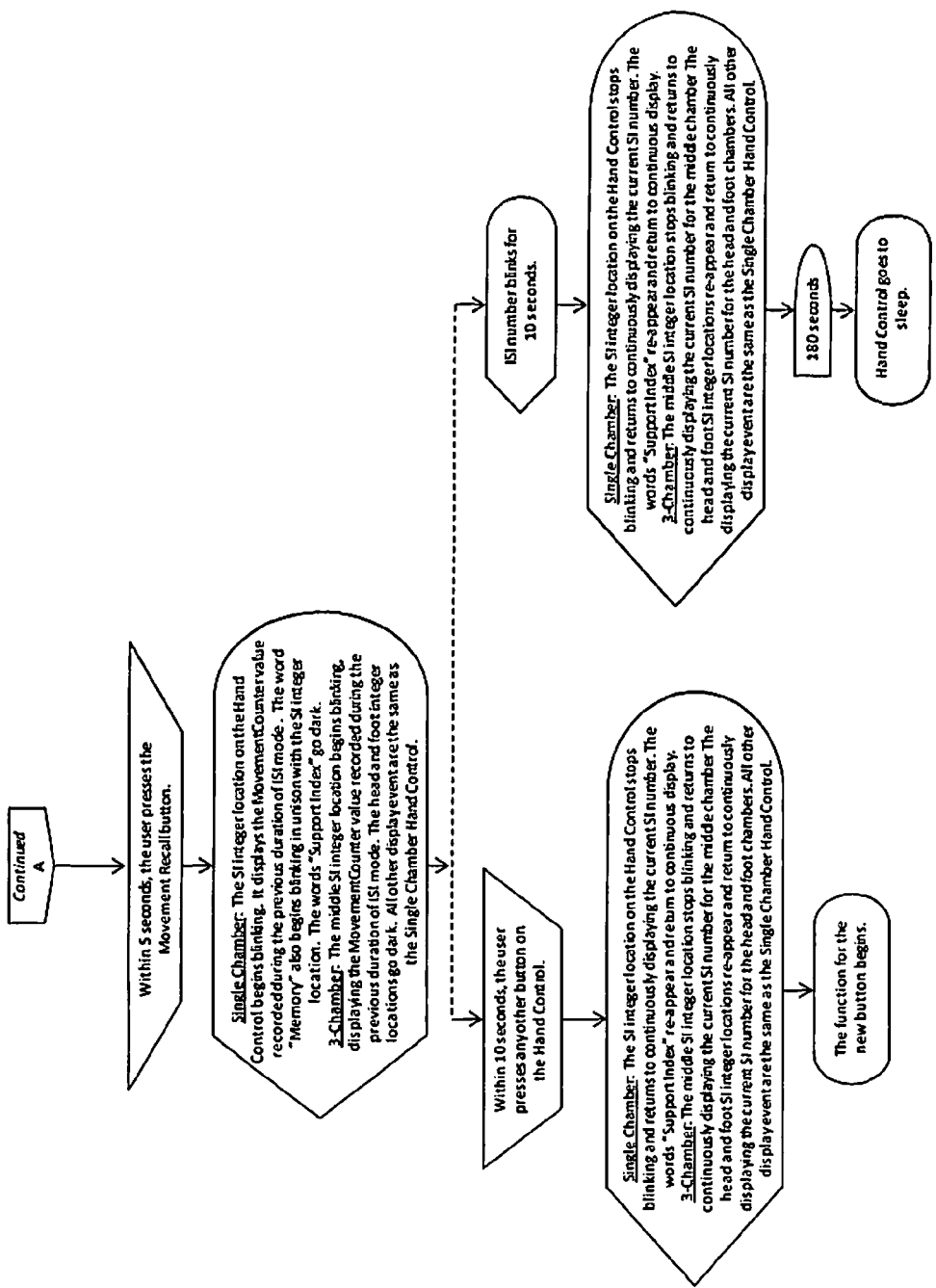

FIGS. 18A-B are a flow chart of the logic for operating the comfort index button on some controllers of the various embodiments of this invention; and FIGS. 19A-C are a flow chart of the logic for operating the ideal support index button on some controllers of the various embodiments of this invention;

Corresponding reference numerals indicate corresponding parts throughout the several views of the drawings.

DETAILED DESCRIPTION

Example embodiments will now be described more fully with reference to the accompanying drawings.

Figure 1:
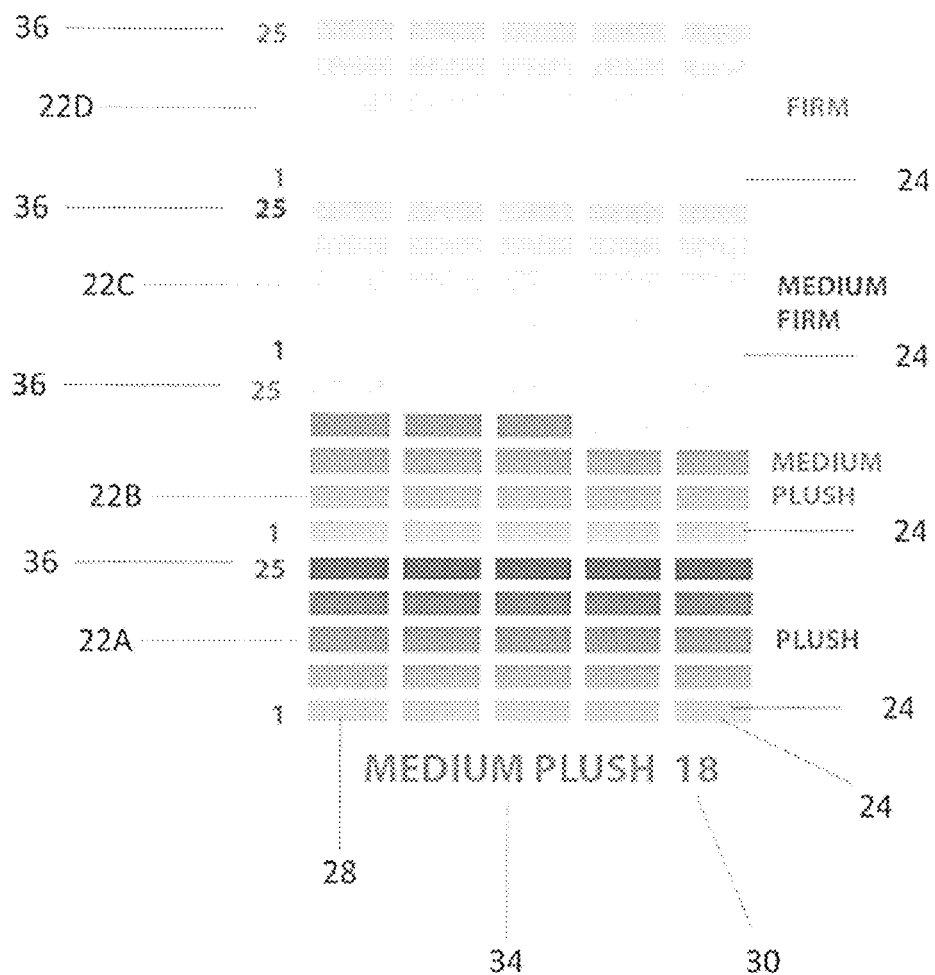
FIG. 1 is a schematic diagram of a display in accordance with a first preferred embodiment of this invention.
Figure 2:
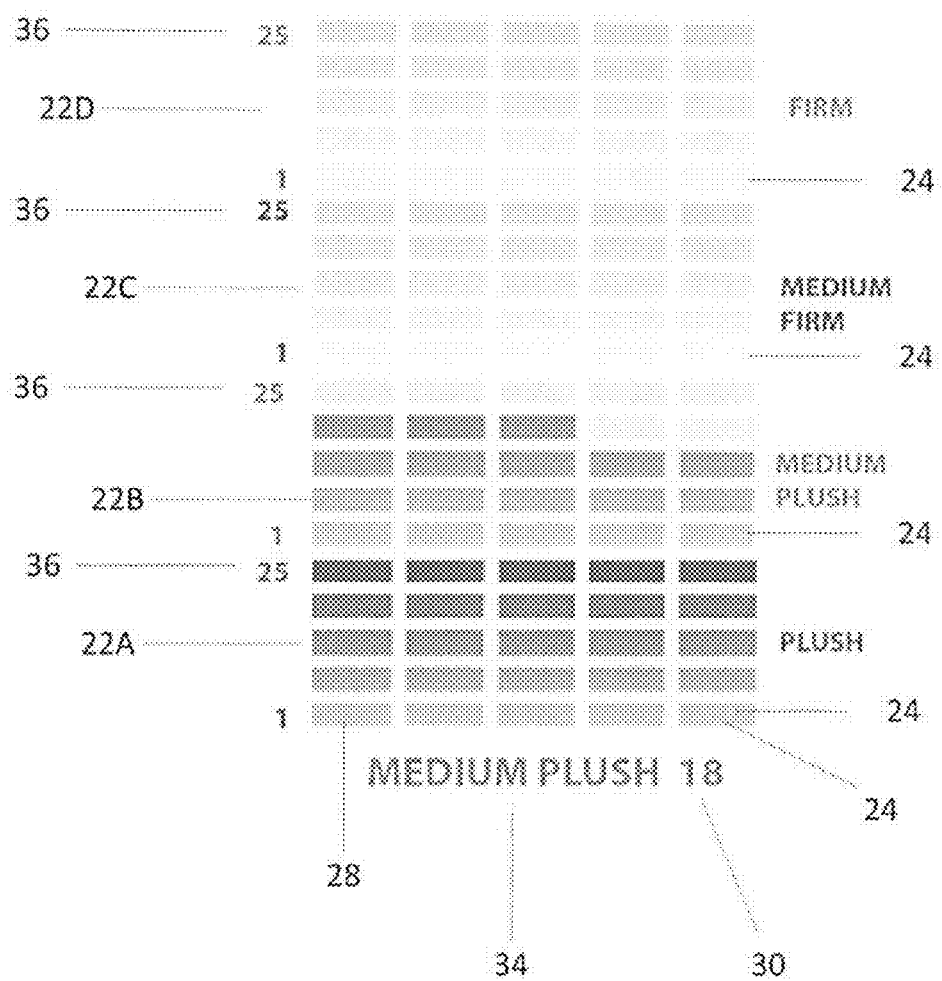
FIG. 2 is a schematic diagram of a display in accordance with a the first preferred embodiment.

A first preferred embodiment of a display for use with air cushions, such as air mattresses, in accordance with the principles of the present invention is indicated generally as 20 in FIGS. 1 and 2.

The display 20 comprises a plurality of arrays 22 of elements 24 organized in a hierarchy. In this preferred embodiment there are four arrays 22A, 22B, 22C, and 22D, but there could be fewer or more arrays. Each of the arrays 22 is a different color, for example the elements 24 in array 22A can be dark blue, the elements in array 22B can be green, the elements in array 22C can be purple, and the elements in array 22D can be light blue. Of course the arrays could be other colors, or all the arrays could be the same color. For example each array could be different shade of the same color, corresponding in color intensity (or other property) to the increase in pressure. Each of the elements 24 represents a pressure increment. The elements 24 preferably each indicate the same pressure increment, but could represent different pressure increments. For example, the value of an element could depend upon its location.

Each array 22 preferably comprises a plurality of rows 26 of a plurality of columns 28 of elements. In this preferred embodiment, each array comprises five rows 26 of five columns 28, for a total of 25, but there could be some other number of indicators in the array, and/or some other number of rows and/or columns. The elements 24 in each row 26 of an array 22 are preferably distinctive in appearance from the elements in the other rows of the array. For example, the elements 24 of each row could have a different intensity, a different shade, tint, tone, hue, or chroma. A control (not shown) operates the elements 24 to indicate the pressure beginning with the first column, of the first row, of the lowest array in the hierarchy. When the pressure increases, the next element 24 is activated, i.e. the element in the next column of current row, or when the current row is completed, the first column of the next row, or when all the rows are completed, the first column of the first row of the next array, is activated. Similarly, when the pressure decreases, the last element 24 that was activated, i.e., the activated element in the highest column, of the highest row, of the highest array, is deactivated.

The display 20 preferably further comprises an indicator 30 that displays a numerical value corresponding to the value being displayed by the elements 24. This numerical value can corresponds to the total number of elements that are actuated but preferably is the total number of elements that are actuated in the highest array in the hierarchy which has an actuated element. Where each array 22 preferably has a unique color, the numerical value is displayed on the indicator 30 in the same color as the highest array in the hierarchy which has an activated element.

The display 20 preferably also includes an indicator (not shown) that displays an alphanumeric character corresponding to the highest array in the hierarchy which has an activated element. This value is preferably displayed in the same color as the highest array in the hierarchy which has an activated element.

Each of the arrays of the display is preferably assigned a descriptive name, and the display 20 preferably includes an indicator 34 that displays the descriptive name corresponding to the highest array in the hierarchy which has an activated element, and this name is preferably displayed in the same color as the highest array in the hierarchy which has an activated element. In this preferred embodiment the arrays 22 can have the associated descriptive name "plush" for array 22A, "medium plush" for array 22B, "medium firm" for array 22C, and "firm" for array 22D.

The display 20 shown in FIG. 1 has all the elements in array 22A activated, and 18 of the elements in array 22B activated. Consequently, the Indicator 34 has the name "medium plush" displayed in the color associated with array 22B, and indicator 30 has the number 18 displayed in the color associated with array 22B. Labels 36 can be provided to advise the user of the total number of indicators in each array, to provide a contact for the number displayed by indicator 30.

The display 20 shown in FIG. 2 has all the indicators in arrays 22A, 22B, 22C, and 22D activated. Consequently, the Indicator 34 has the name "firm" displayed in the color associated with array 22D, and indicator 30 has the number 25 displayed in the color associated with array 22D.

Figure 3:
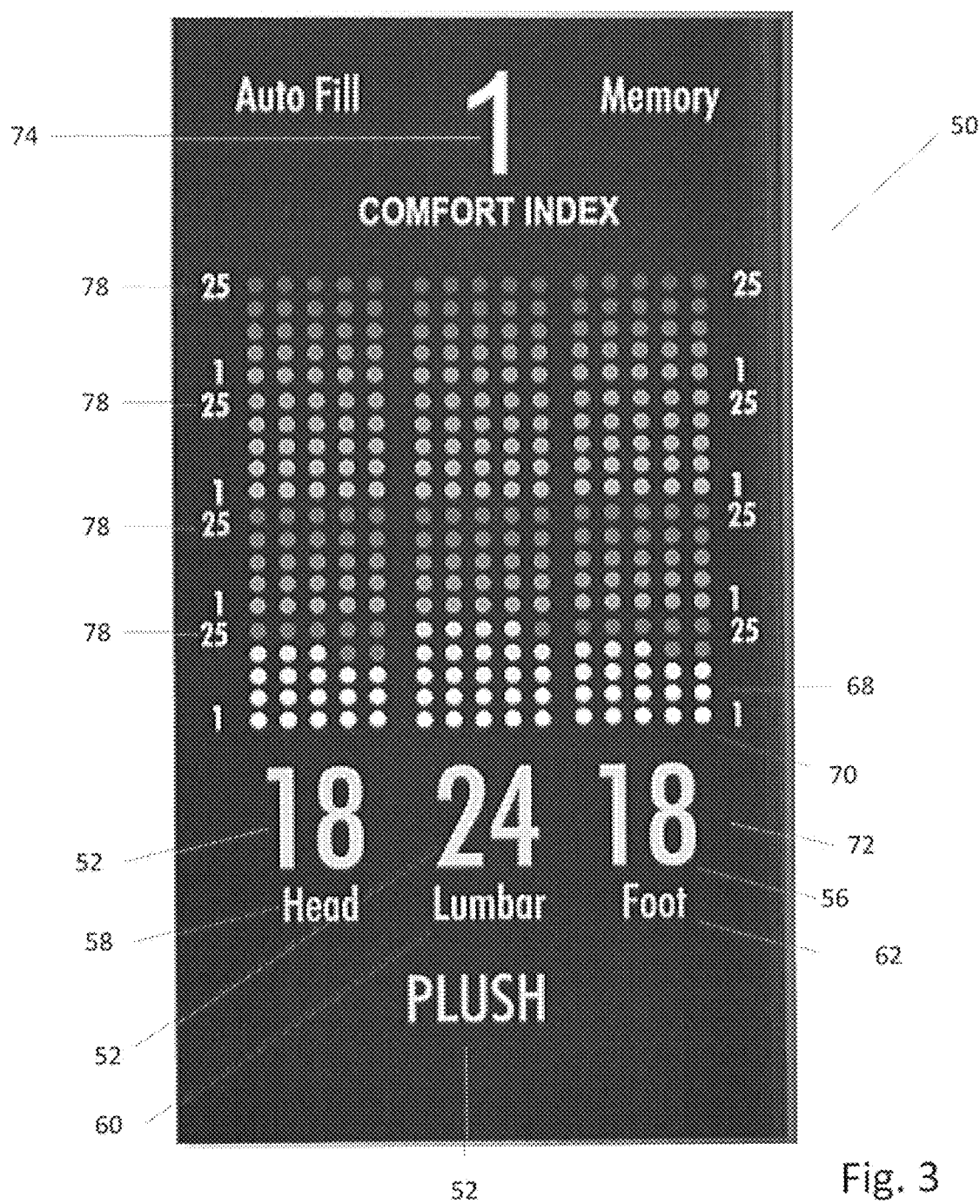
FIG. 3 is a front elevation view of a display in accordance with a second preferred embodiment of this present invention.
Figure 4:
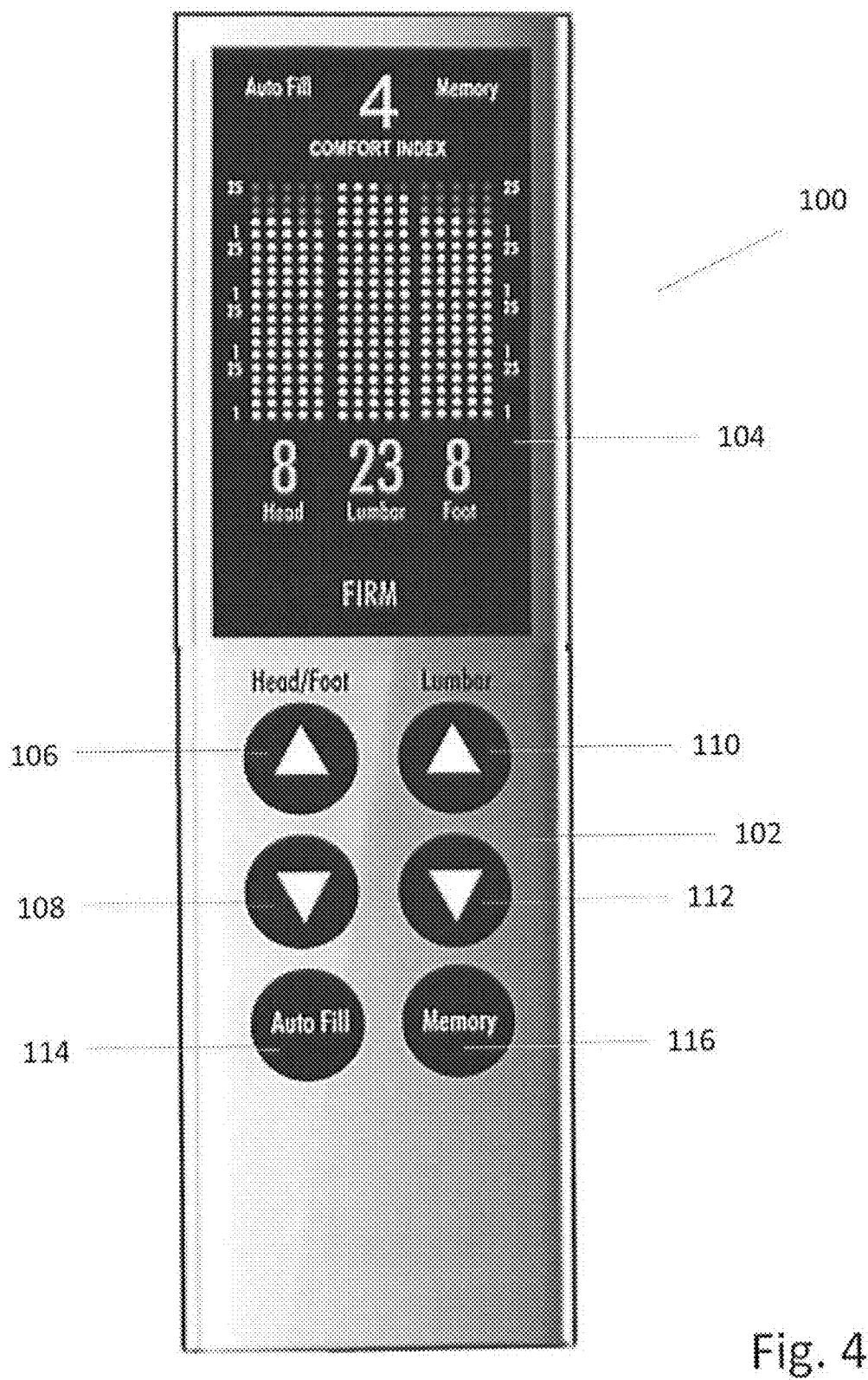
FIG. 4 is a front elevation view of a first embodiment of a controller incorporating a display in accordance with the principles of the present invention.
Figure 5:
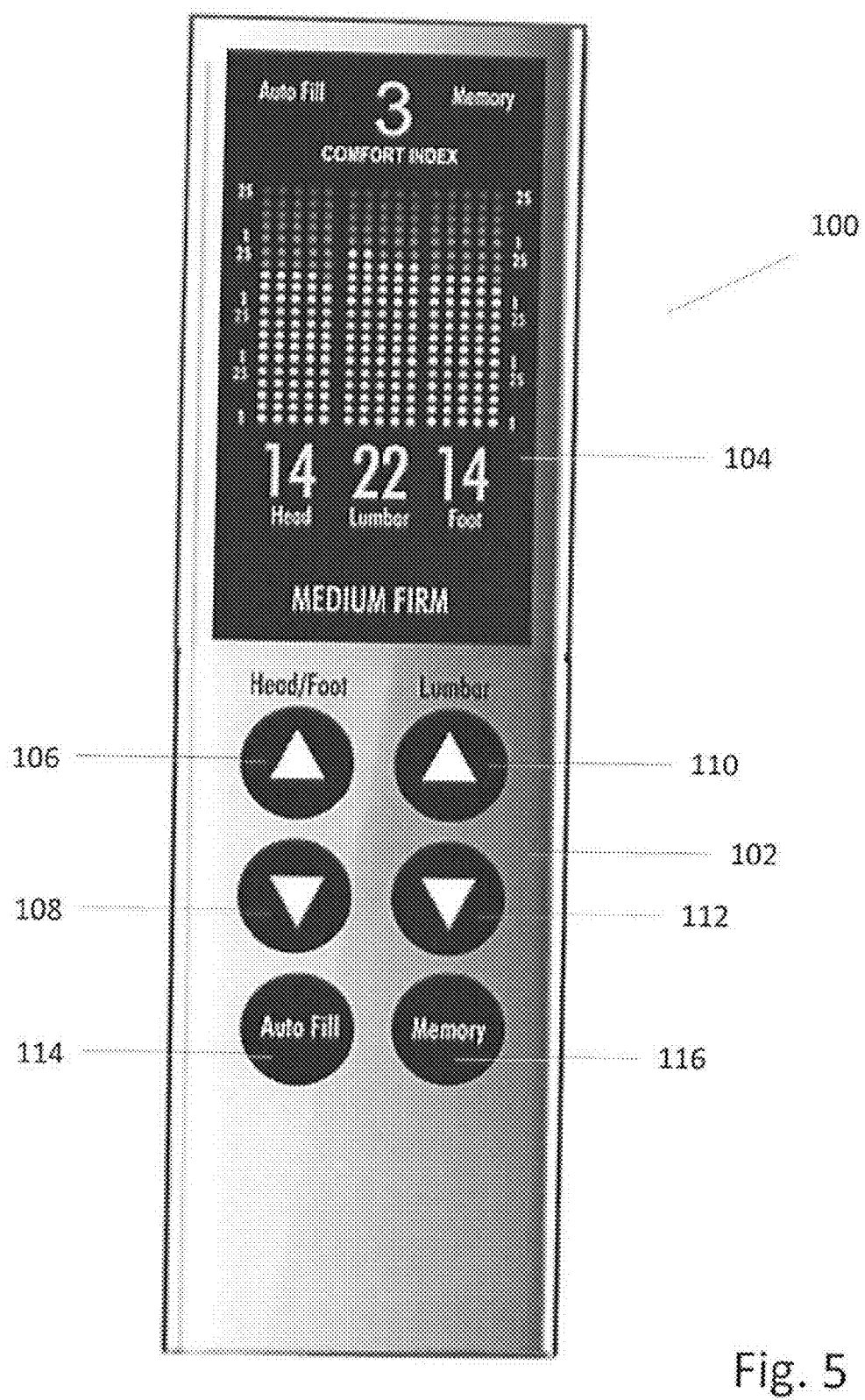
FIG. 5 is a front elevation view of the controller incorporating a display in accordance with the principles of this invention.
Figure 6:
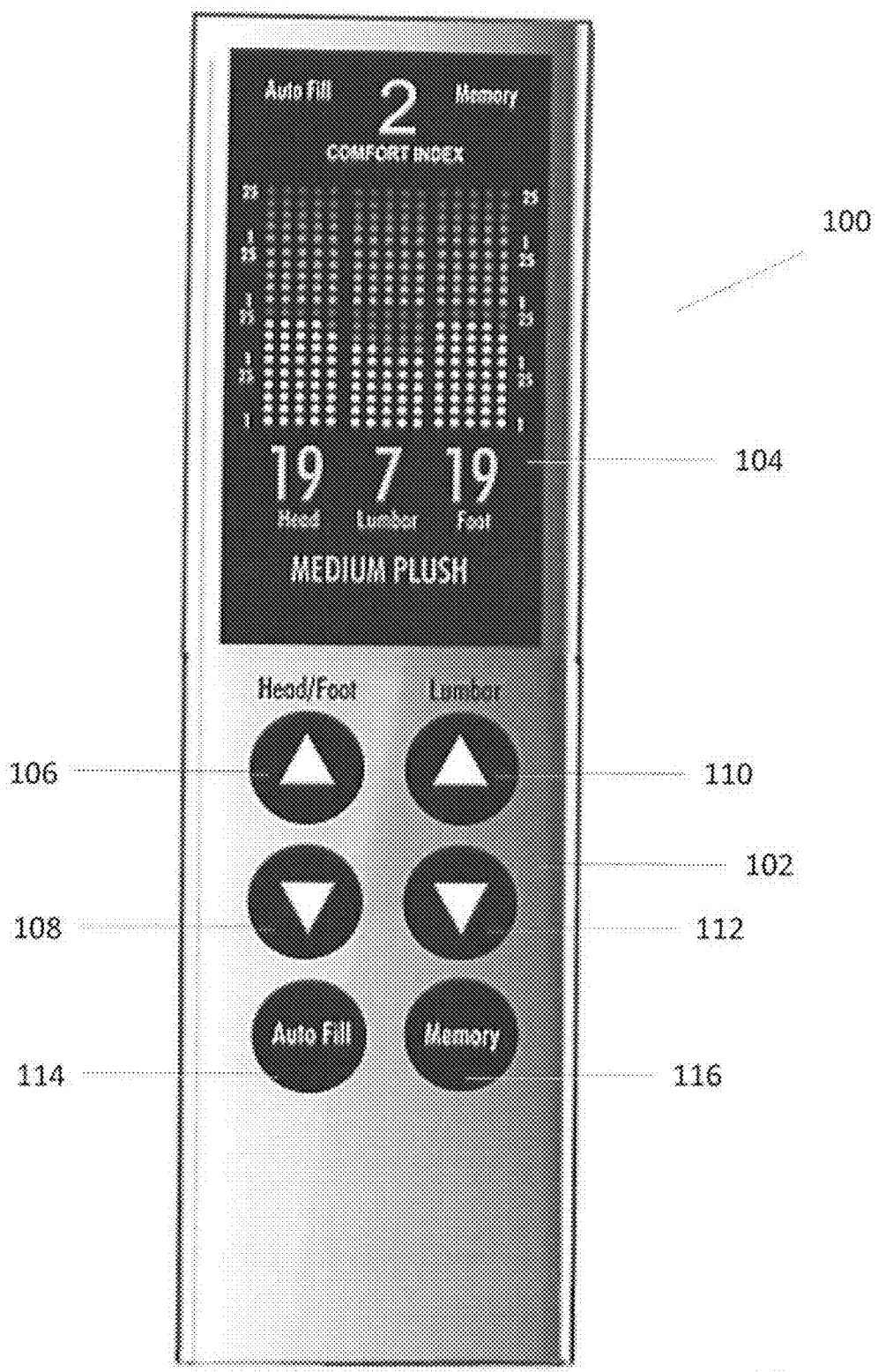
FIG. 6 is a front elevation view of the controller incorporating a display in accordance with the principles of this invention.
Figure 7:
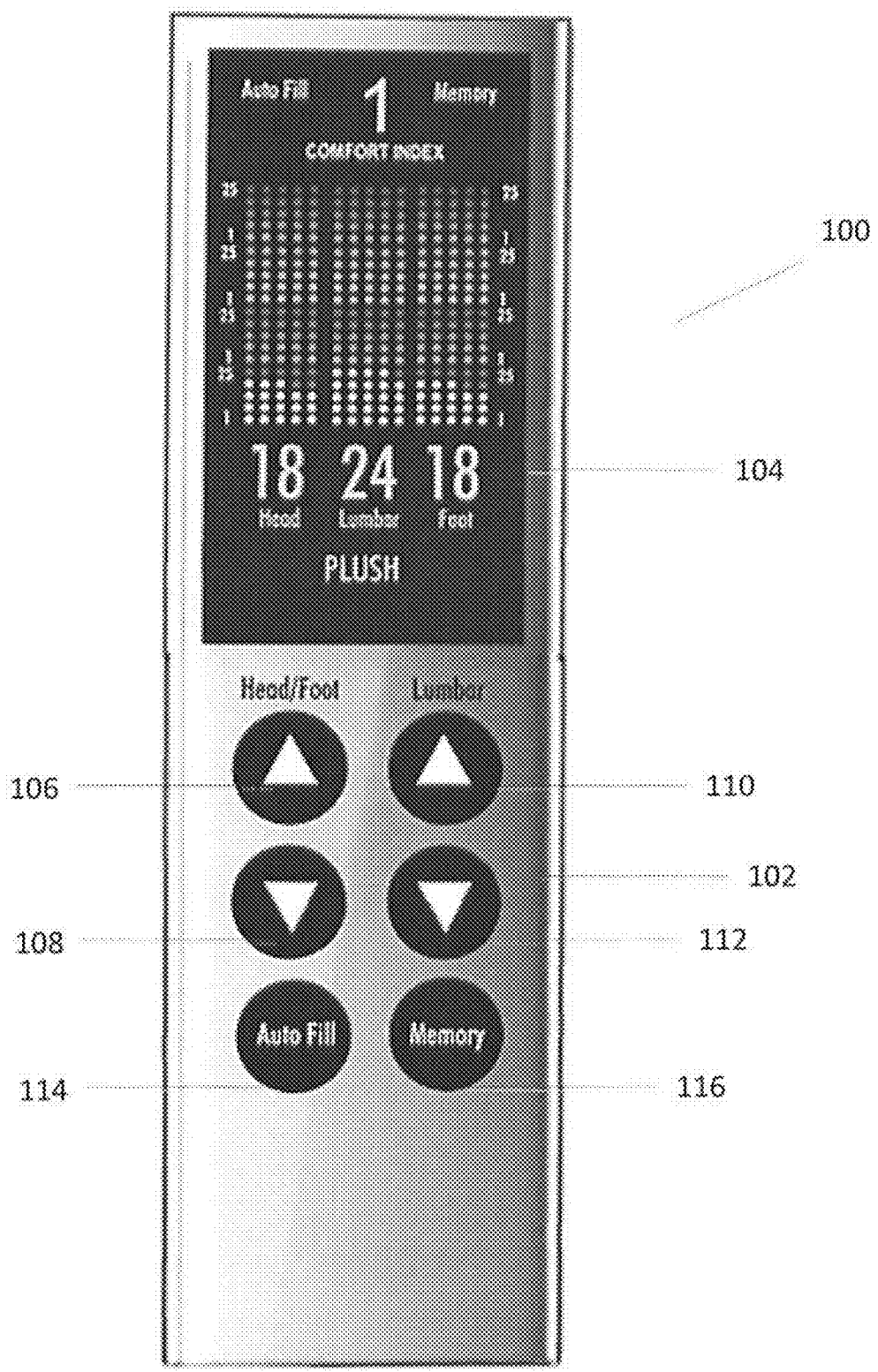
FIG. 7 is a front elevation view of the controller incorporating a display in accordance with the principles of this invention.

A second embodiment of a display is indicated generally as 50 in FIG. 3. The display 50 is adapted for use with a multi-chamber air mattress. In this particular embodiment, the display 50 is adapted for use with a mattress having a head, a lumbar, and a foot chambers (although the head and foot chambers are interconnected, and therefore have the same pressure), and has sub displays 52, 54, and 56 each with a descriptive label 58, 60, and 62 identifying the chamber whose pressure is indicated by the particular subdisplay.

Each of the subdisplays 52, 54, and 56 comprises a plurality of arrays 64 of elements 66 organized in a hierarchy. In this preferred embodiment each of the subdisplays has four arrays 64A, 64B, 64C, and 64D, but there could be fewer or more arrays. Each of the arrays 64 is a different color, for example the elements 66 in array 64A can be blue, the elements in array 66B can be green, the elements in array 66C can be yellow, and the elements in array 66D can be orange. Of course the arrays could be other colors, or all the arrays could be the same color. For example each array could be different shade of the same color, corresponding in color intensity (or other property) to the increase in pressure. Each of the elements 66 represents a pressure increment. The elements 66 preferably each indicate the same pressure increment, but could represent different pressure increments, for example depending upon the location of the indicator.

Each array 64 preferably comprises a plurality of rows 68 of a plurality of columns 70 of elements 66. In this preferred embodiment, each array 64 comprises five rows 68 of five columns 70, for a total of 25, but there could be some other number of elements 66 in the array, and/or some other number of rows and/or columns. The elements 66 in each row 68 of an array 66 are preferably distinctive in appearance from the indicators in the other rows of the array. For example, the elements 66 of each row could have a different intensity, a different shade, tint, tone, hue, or chroma. A control (not shown) operates the elements 66 to indicate the pressure in the subdisplays respective chamber beginning with the first column, of the first row, of the lowest array in the hierarchy. When the pressure increases, the indicator 66 of the next column of current row, or when the row is completed, the first column of the next row, or when all the rows are completed, the first column of the first, row of the next array, is activated. Similarly, when the pressure decreases, the appropriate indicators are deactivated, beginning with the last indicator (i.e., the last activated column, of the last activated row, of the last activated array).

The subdisplays 52, 54, and 56, preferably further comprise an indicator 72 that displays a numerical value corresponding to the value being displayed by the elements 66. Where each array 64 preferably has a unique color, the numerical value is displayed on the indicator 72 in the same color as the highest array in the hierarchy which has an activated element.

The display 50, preferably also includes an indicator 74 that displays an alphanumeric character corresponding to the highest array in the hierarchy which has an activated element, and this value is preferably displayed in the same color as the highest array in the hierarchy which has an activated element. When multiple chambers are present, the chambers are preferably automatically controlled so that all of the chambers pressures are in the range indicated by the same array in each of the subdisplays. This means that a single indicator 74 can display an alphanumeric character corresponding to the highest array in the hierarchy which has an activated element. In other embodiments where the pressures among the chambers are not so controlled, multiple indicators 74 can be provided, one for each of the subdisplays 52, 54, and 56.

Each of the arrays 68 of the subdisplays 53, 54, and 56 is preferably assigned a descriptive name, and the display 50 includes an indicator 76 that displays the descriptive name corresponding to the highest array in the hierarchy which has an activated element, and this name is preferably displayed in the same color as the highest array in the hierarchy which has an activated element. In this preferred embodiment the arrays 64 can have the associated descriptive name "plush" for array 64A, "medium plush" for array 64B, "medium firm" for array 64C, and "firm" for array 64D. As described above when multiple chambers are present the chambers are preferably automatically controlled so that all of the chambers pressures are in the range indicated by the same array in each of the subdisplays. This means that a single indicator 76 can display the name corresponding to the highest array in the hierarchy which has an activated element. In other embodiments where the pressures among the chambers are not so controlled, multiple indicators 76 can be provided, one for each of the subdisplays 52, 54, and 56.

The subdisplays 52 and 56 shown in FIG. 3 have 18 elements 66 in array 64A activated. Consequently, the indicator 76 has the name "plush" displayed in the color associated with array 64A, and indicator 72 has the number 18 displayed in the color associated with array 64A. Labels 78 can be provided to advise the user of the total number of elements in each array, providing contact for the number shown by indicator 72. The subdisplay 54 shown in FIG. 3 has 24 of the elements in array 64A activated. Consequently, the indicator 72 has the number 24 displayed in the color associated with the array 64A.

According to another embodiment, a controller according to a first preferred embodiment, indicated generally as 100, is provided for controlling the pressure in an air cushion, such as an air mattress. The preferred embodiment of this controller 100 (shown in FIGS. 4-7) preferably comprises a plurality of controls 102 for operating a pressure system to change the pressure in the air mattress, and at least one display 104 in accordance with this disclosure.

The controller 100 can be adapted for controlling the pressure in each of the chambers of a multi-chamber air mattress, for example a mattress having a head, a lumbar, and a foot chambers (although the head and foot chambers are interconnected, and therefore have the same pressure). The controller 100 preferably has controls for operating a pressure system (such as an air pump that pumps air into or out of the chamber), and may include buttons 106 and 108 for increasing and decreasing the pressure in the head and foot chambers, and buttons 110 and 112 for increasing and decreasing the pressure in the lumbar chamber. The controller can include other controls for example an auto-fill button 114 that operates the pressure system to fill the chambers to a either a predetermined factory setting, or a previously stored user setting. The controller can also include a memory button 116 that saves the current user determined settings, so that pressing the auto-fill button 114 automatically restores the mattress to previously saved user setting. Of course additional or different controls could be provided in the controller 100 if desired. For example a single set of pressure increase and decrease buttons could be provided, and a selector control that allows the user to select the chamber to be controlled by the single set of pressure increase and decrease buttons.

As the pressure in the chambers is changed, the display 104, which is preferably constructed according to the principles of this invention, for example display 50 is updated. The display 50 provides detailed feedback information to the user so that the user can better control the pressure in the chambers for maximum comfort. The display 50 provides a numerical display of the current pressure in each chamber though indicators 72, which display a numerical value for the current region or comfort index. The display 50 also provides a graphical display of the total current pressure in each chamber (through the arrays 64 of elements 66) so that the users can better visualize the pressure value and better visually interpret the pressure differences between the chambers. The display 50 also displays both a numerical and verbal cue to the level of firmness corresponding to the current pressure, through indicators 74 and 76 and a visual cue through the color coordination of the indicators 72, 74, and 76.

The controller 100 can be implemented as a wired device connected to the pressure system via a wire (not shown). Alternatively, the controller 100 can be implemented as a wireless device, with the controller wireless connected to the pressure system, for example by a Bluetooth, Wi-Fi, ZigBee, x10, Z-Wave, radio frequency (RF), infrared or other wireless connection. The controller may even be implemented as a program (app) running on a smart phone or a tablet. In the case of a smart phone or tablet, the controls may be virtual buttons, sliders, or other types of control elements displayed on the screen of the device, which can be operated by the user. Similarly the display portion 50 of the controller 100 can be implemented by a plurality of lit, partially lit, or unlit areas on the screen of the device. Unactivated elements may be completely blank or they may be outlined or partially lit to give the user a sense of how many elements are activated and how many elements are not activated.

Figure 8:
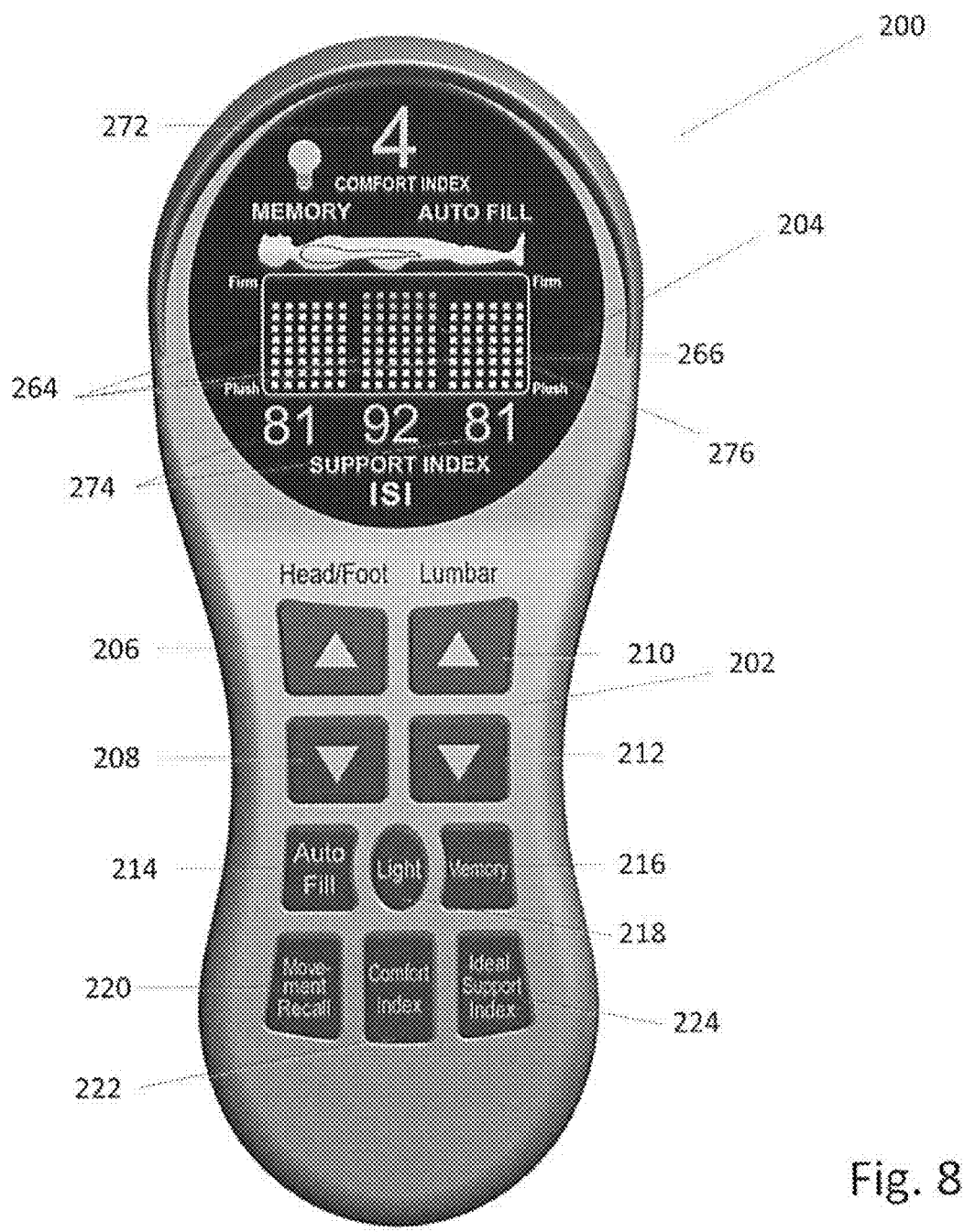
FIG. 8 is a front elevation view of a second embodiment of a controller incorporating a display in accordance with the principles of the present invention.
Figure 9A:
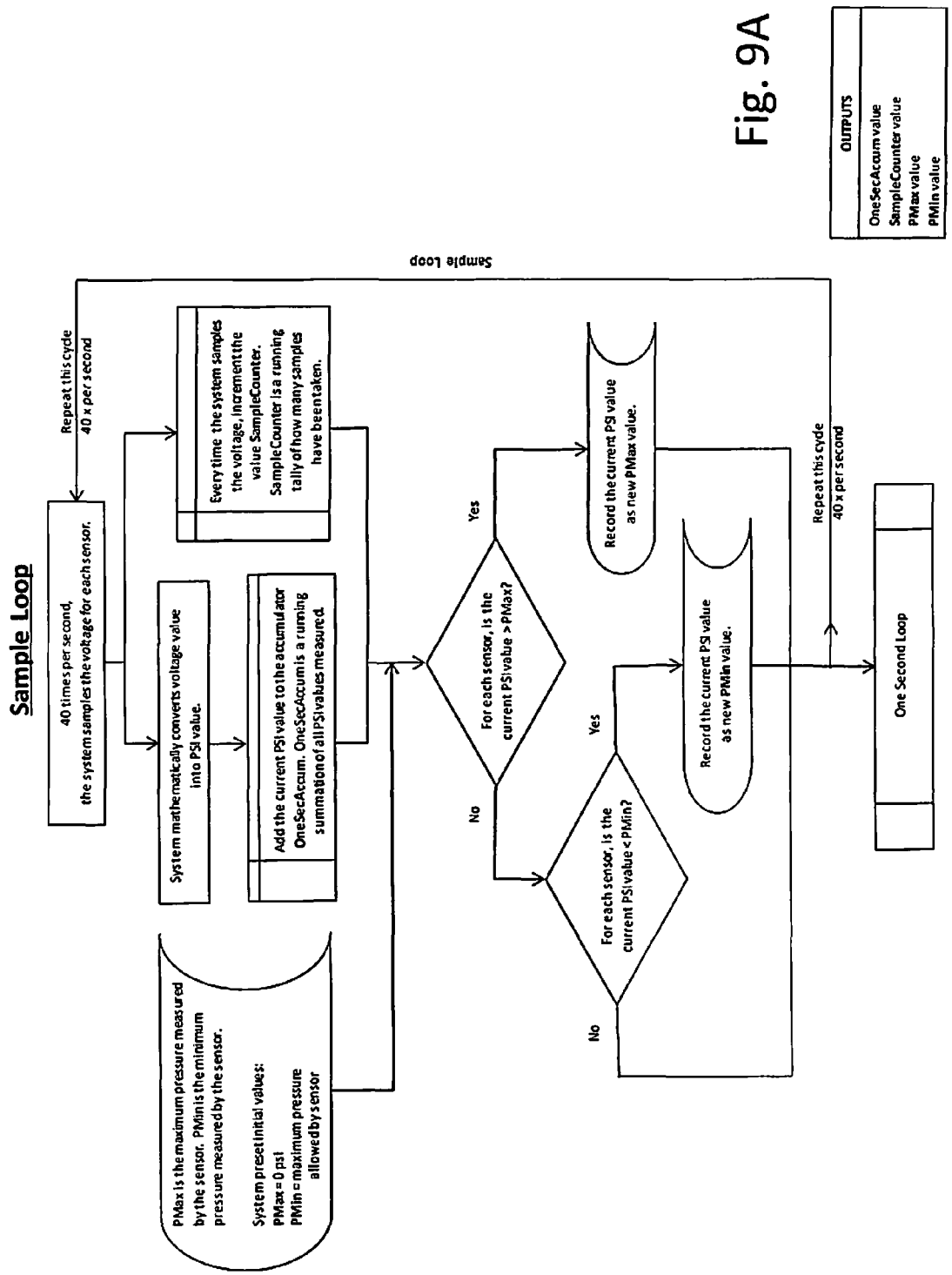
Figure 9C:
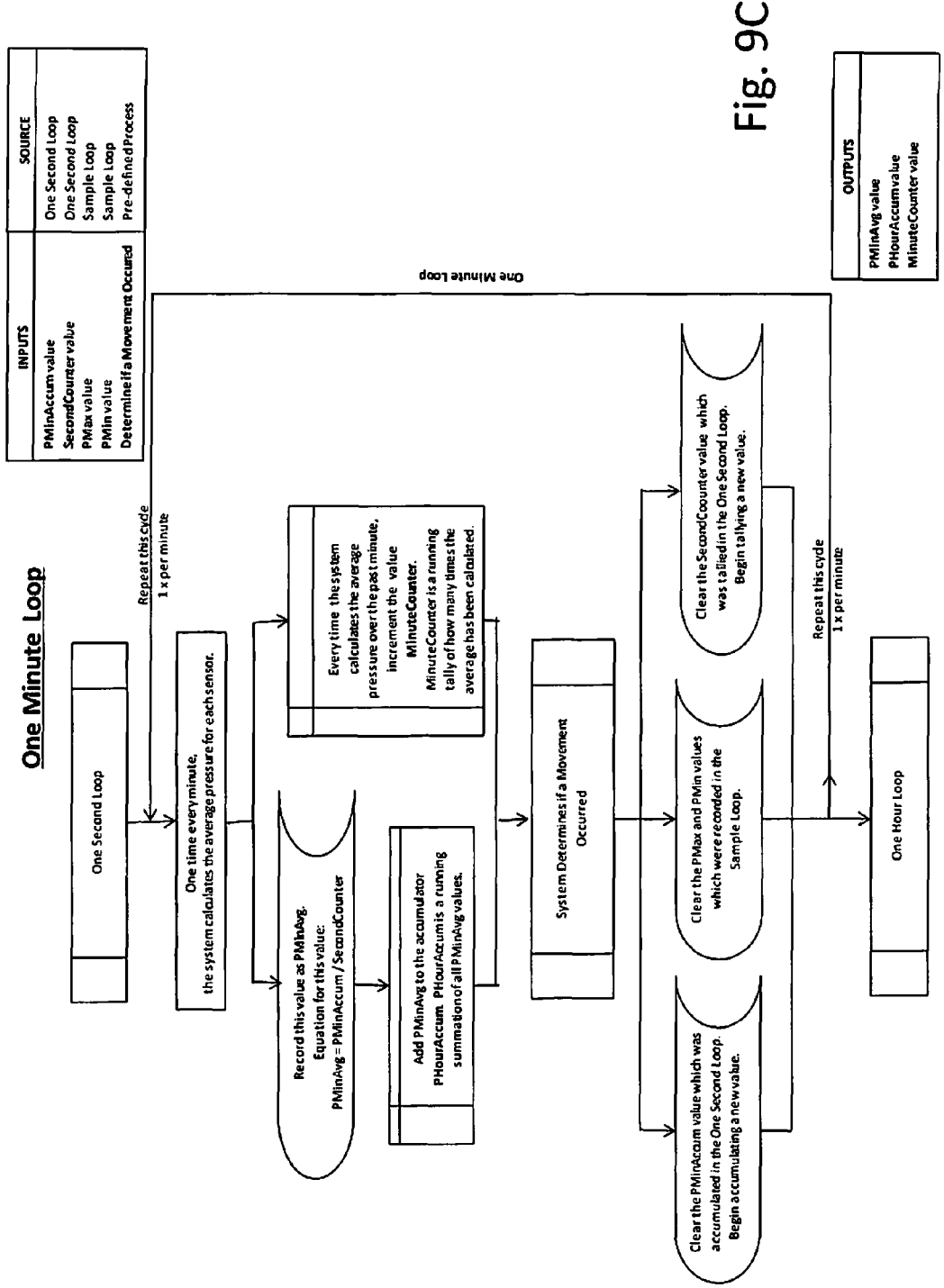
Figure 12:
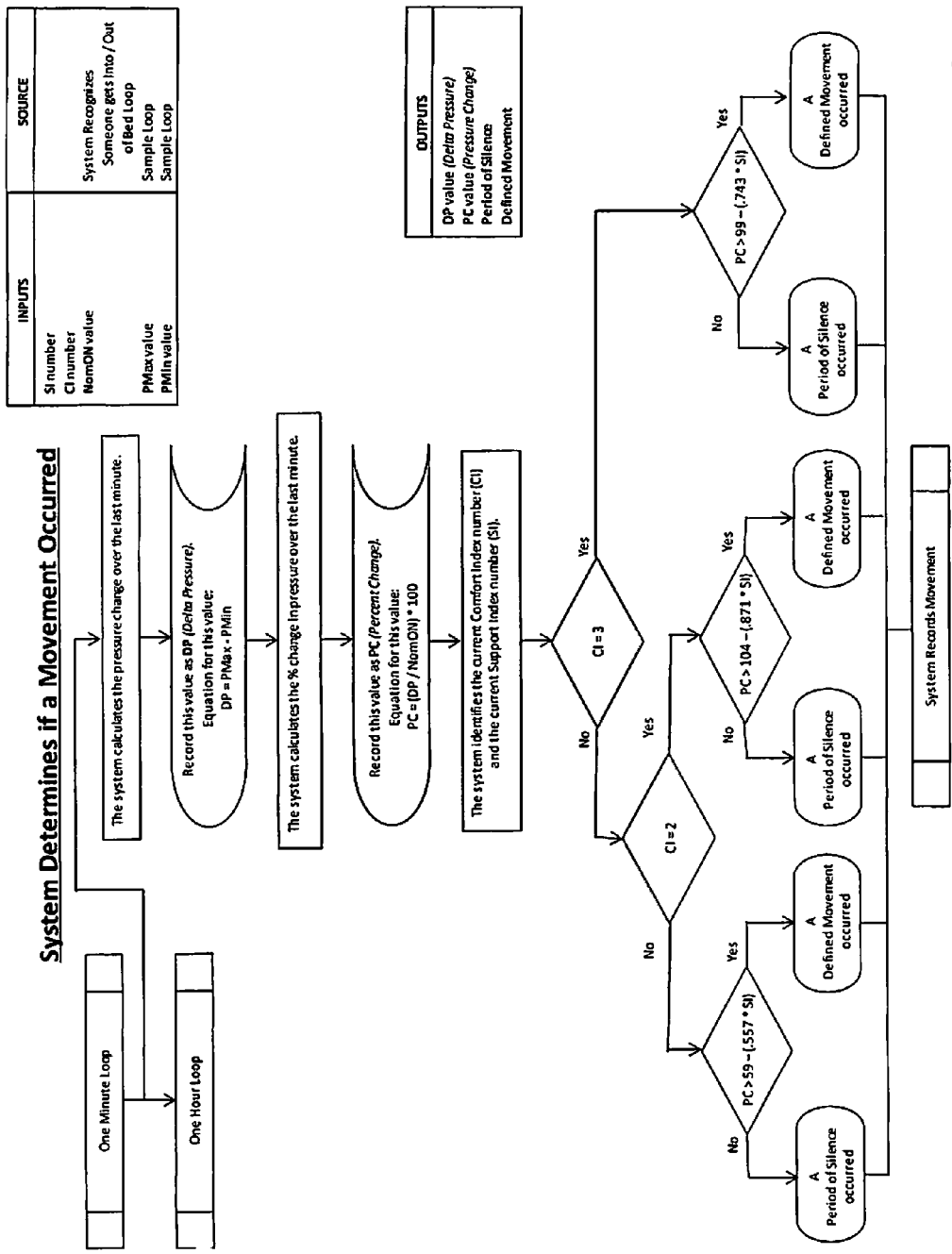
FIG. 12 is a flow chart of the logic for determining when movement occurs on the bed for use with the displays and controllers of the various embodiments of this invention.
Figure 13:
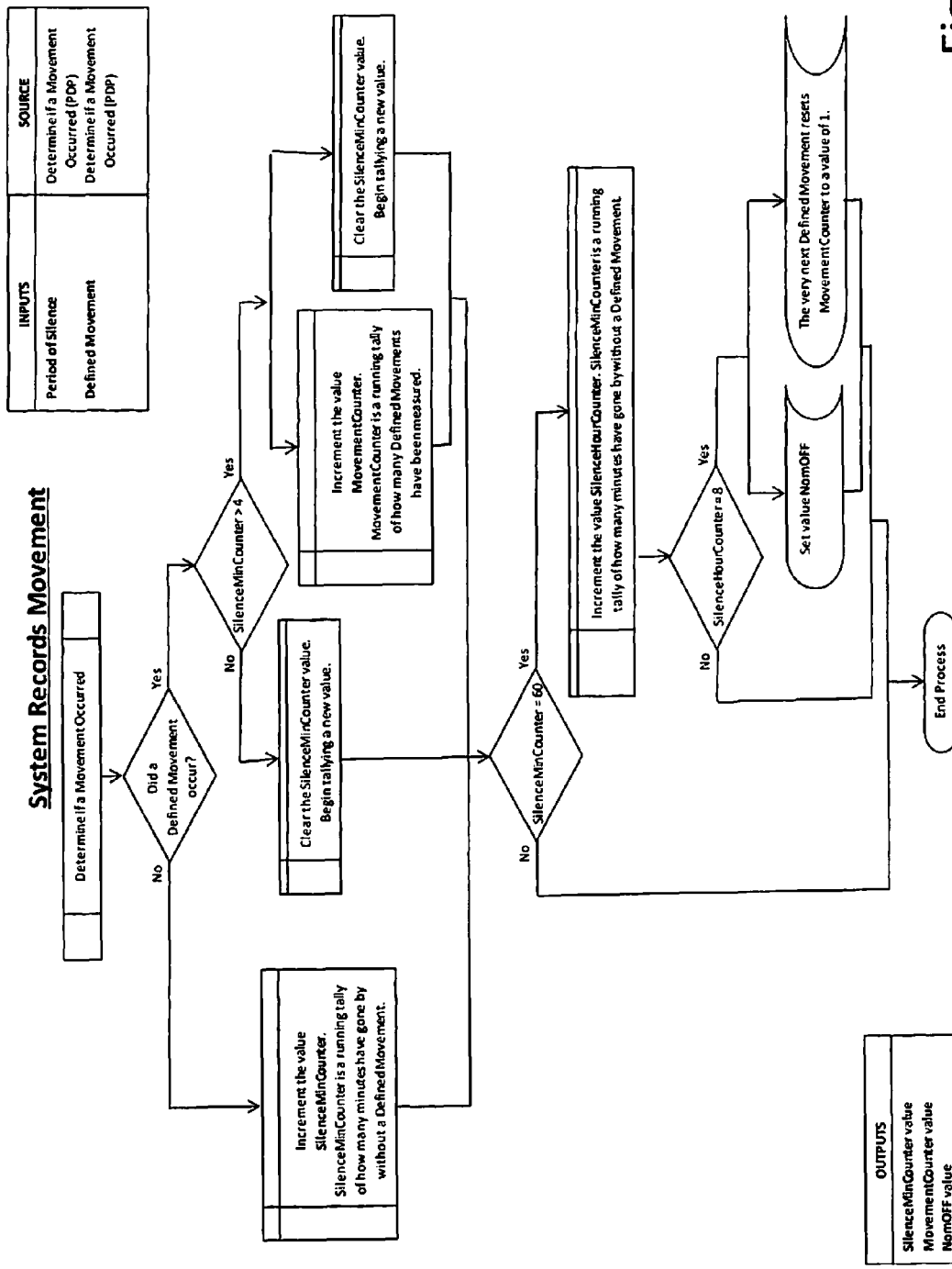
FIG. 13 is a flow chart of the logic for recording movement on the bed for use with the displays and controllers of the various embodiments of this invention.
Figure 15:
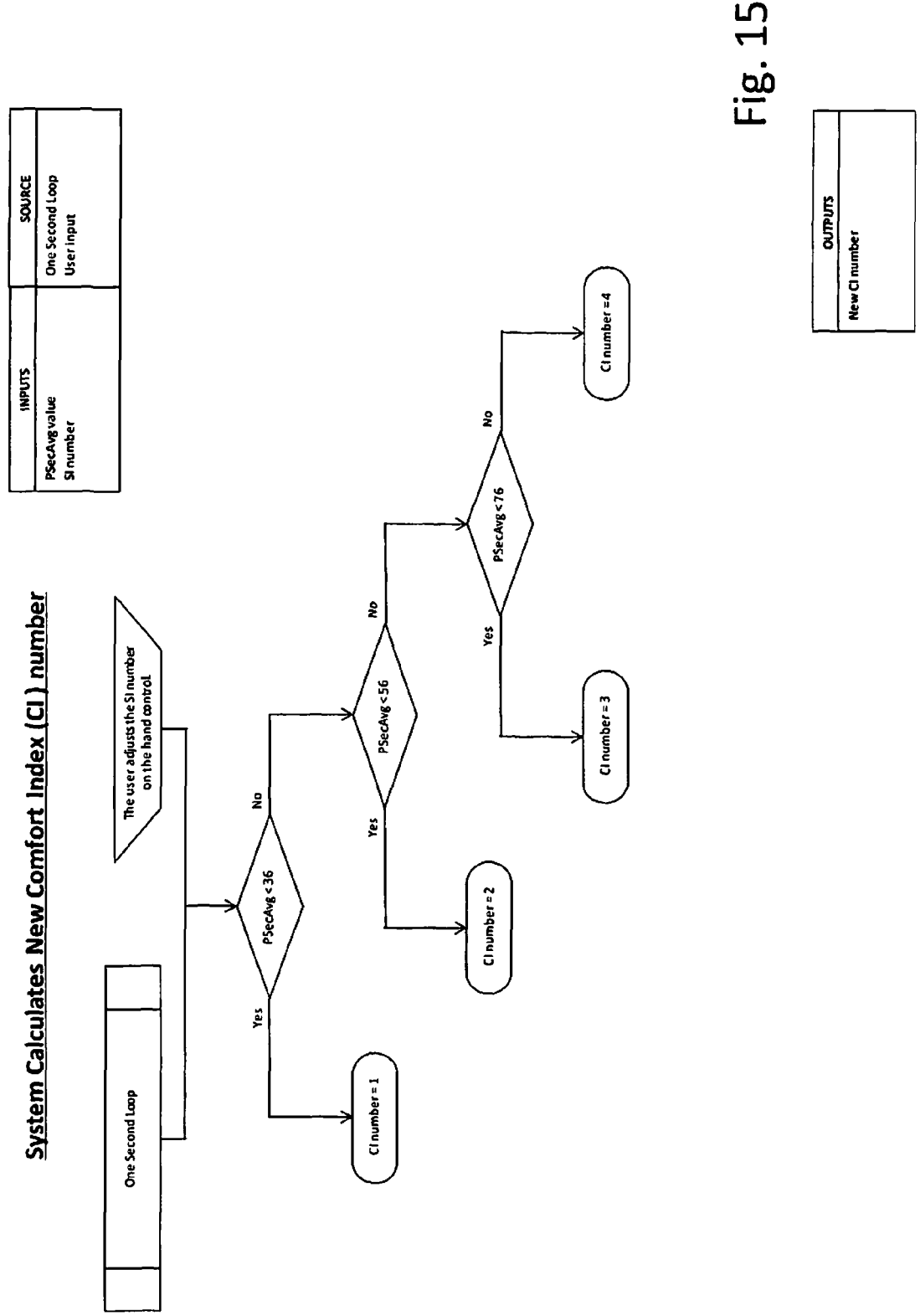
FIG. 15 is a flow chart of the logic for determining the comfort index for use with the displays and controllers of the various embodiments of this invention

According to another embodiment, a controller according to a second preferred embodiment, indicated generally as 200, is provided for controlling the pressure in an air cushion, such as an air mattress. The preferred embodiment of this controller 200 (shown in FIG. 8) preferably comprises a plurality of controls 202 for operating a pressure system to change the pressure in the air mattress, and at least one display 204 in accordance with this disclosure.

The controller 200 can be adapted for controlling the pressure in each of the chambers of a multi-chamber air mattress, for example a mattress having a head, a lumbar, and a foot chambers (although the head and foot chambers are interconnected, and therefore have the same pressure). The controller 200 preferably has controls 202 for operating a pressure system (such as an air pump that pumps air into or out of the chamber), and may include buttons 206 and 208 for increasing and decreasing the pressure in the head and foot chambers, and buttons 210 and 212 for increasing and decreasing the pressure in the lumbar chamber. The controller can include other controls for example an auto-fill button 214 that operates the pressure system to fill the chambers to a either a predetermined factory setting, or a previously stored user setting. The controller can also include a memory button 216 that saves the current user determined settings, so that pressing the auto-fill button 214 automatically restores the mattress to previously saved user setting.

Of course additional or different controls could be provided in the controller 200 if desired. For example a single set of pressure increase and decrease buttons could be provided, and a selector control that allows the user to select the chamber to be controlled by the single set of pressure increase and decrease buttons.

Figure 16B:
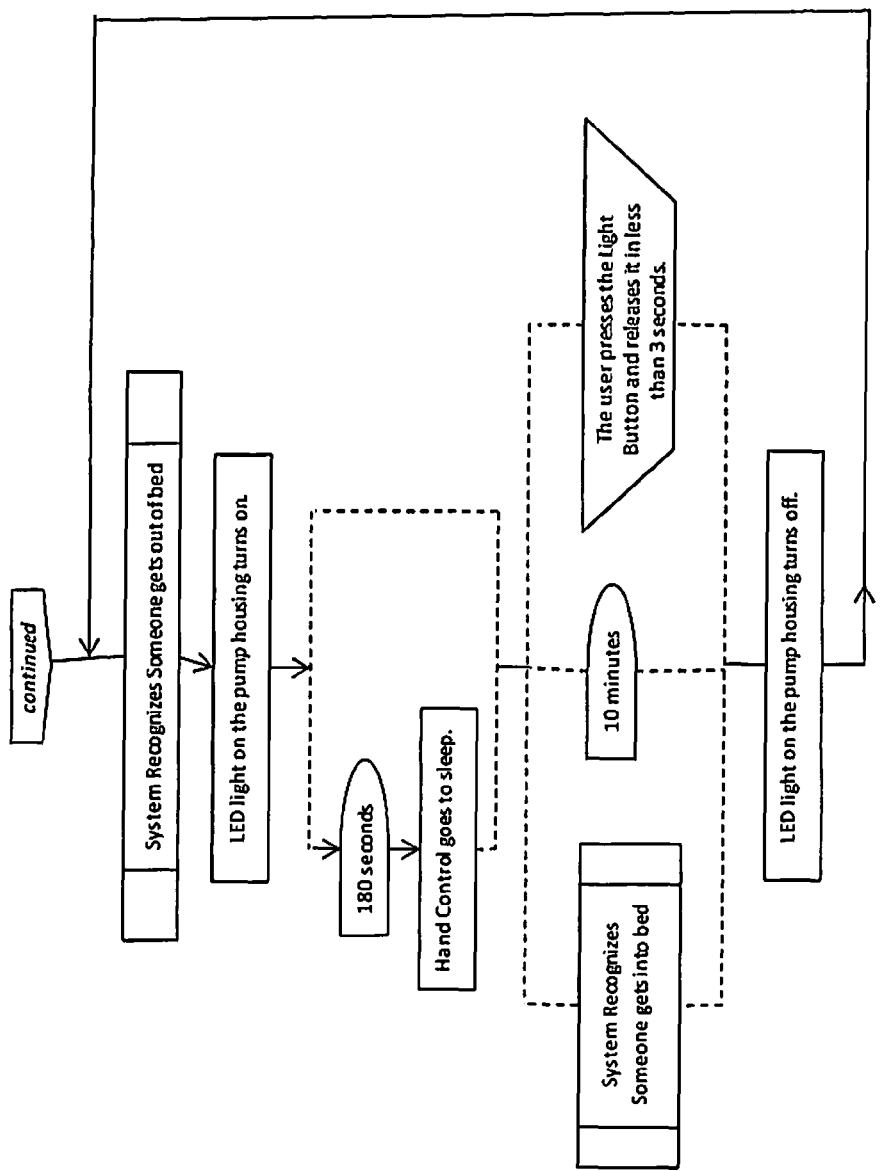

Alternatively or in addition a light control button 218 can be provided for controlling a light (on the controller 200 or elsewhere). The button 218 operates a control whose logic is set forth in FIGS. 16A and 16B. The light control button 218 is pressed to turn the light function on or off. When the light function is on, an LED light associated with the mattress (e.g., with the air pump controlling the pressure) is activated whenever the sensed pressure in the mattress is reduced to a level that indicates that a person has exited the mattress. The light stays on for a predetermined period, e.g., 10 minutes, or until the pressure sensor recognizes that the person has returned to the mattress or when the light off button is engaged from either hand control.

If the light associated with the mattress is off, then pressing the light control button 218 will turn it ON. If the light associated with the mattress is on, then pressing the light control button 218 will turn it off.

When a pressure sensor associated with the mattress recognizes a significant decrease in pressure (e.g., when an individual gets out of bed), the light will turn on automatically. A "significant decrease" may be calculated by a predetermined reduction (e.g., of at least 20%) of the pressure (regardless of the particular pressure reading at the time) and that reduction is maintained for a predetermined minimum period (e.g., 2 seconds).

When a mattress pressure sensor recognizes a "significant" increase in pressure (e.g., when an individual gets of back into bed), the light will turn off automatically. A "significant increase" may be determined by an increase of a predetermined about (e.g., at least 20%) of the pressure (regardless of the particular pressure reading at the time), and that increase is maintained for a predetermined minimum (e.g., 2 seconds).

The automatic light feature preferably can be deactivated, for example if the light control button is pressed for 3 seconds or more, and the automatic pressure sensing software is deactivated or ignored. In this mode, the only way to turn the light on or off would be to press the button (preferably for less than 3 seconds, because holding the button for 3 seconds would preferably toggle on the pressure sensing feature. The air pump preferably includes a control with software activated to sense the pressure change to engage or disengage the light. Whether the automatic pressure sensing feature is engaged can be indicated by an indicator, e.g. indicator 219 on the display 204.

Figure 17:
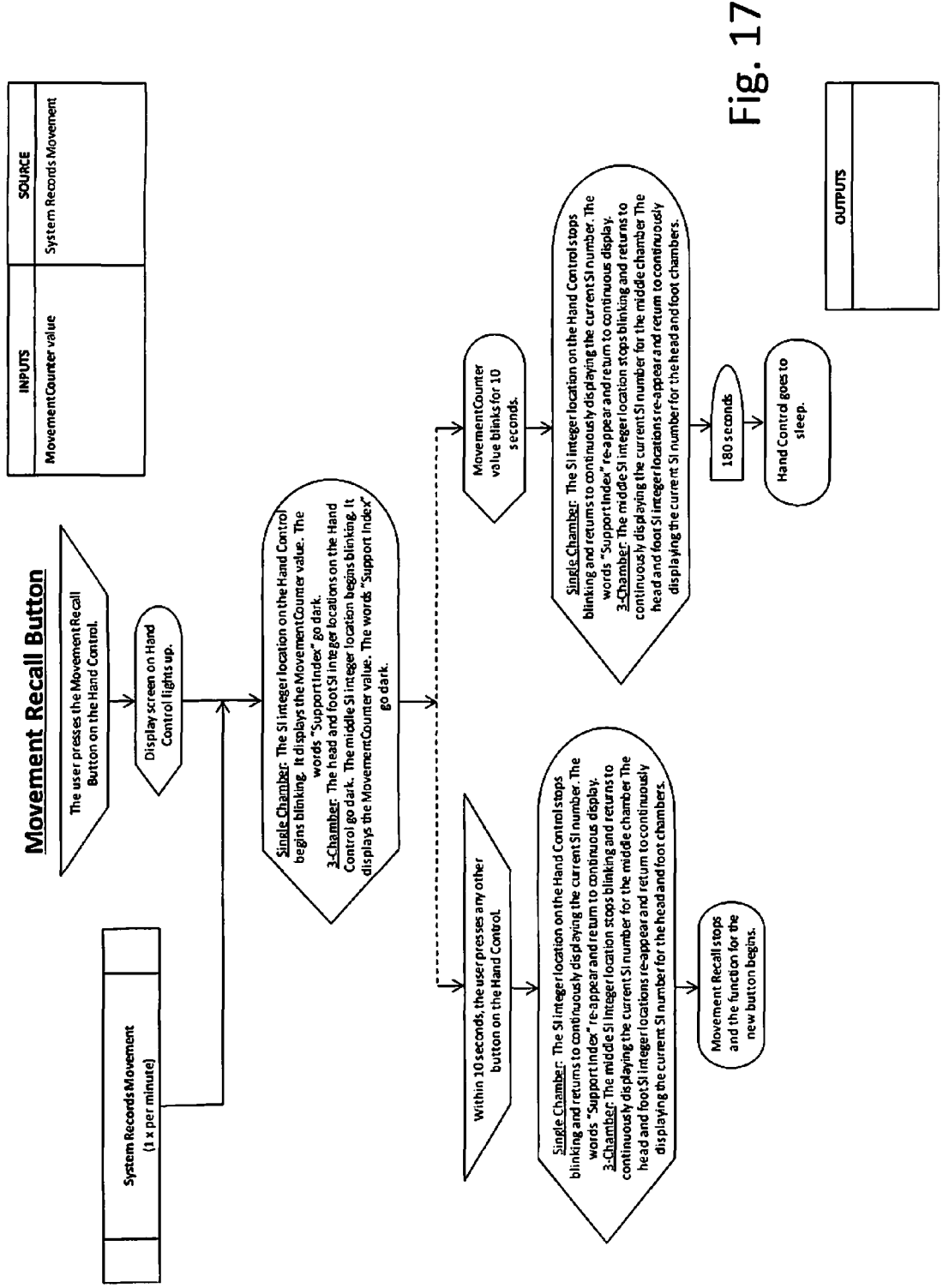
FIG. 17 is a flow chart of the movement recall function for use with the displays and controllers of the various embodiments of this invention.

The controller 200 can also include a movement recall button 220, that operates a control whose logic is set forth in FIG. 17. When the user wakes up in the morning, the user can press the movement recall button 220, and the display 204 will display the number of movements recorded over a predetermined period of time (e.g., 10 hours). The number of defined movements recorded over the previous predetermined period of time can be displayed for example in a blinking mode for, for example 10 seconds in the Support Index number area 274. This will temporarily replace the Support Index number (which can be distinguished because it is in a different color and/or because it does not blink). Alternatively it can be displayed in a separate location. When the movement recall number stops blinking the previous Support Index number will reappear (without blinking) and go to sleep after 180 seconds. If any other button is pressed when the movement recall digits are blinking then the movement routine will stop and the new routine (i.e. auto fill, memory etc.) will engage.

The controller 200 can also include a Comfort Index button 222 that operates a control whose logic is set forth in FIGS. 18A and 18B. The Comfort Index button 222 establishes the weight and weight distribution of the individual as well as a recommended pressure category as expressed in a numerical index. This Comfort Index indicates the appropriate range of recommended support index numbers that would be appropriate for that individual's body profile. An individual's height and weight ratio determines the pressure they will exert on the air mattress which is translated by the pressure sensor(s) to one of 4 categories. Once an individual's Comfort Index is established, it may be used as a modifier with the software function that determines/defines a movement. For example, a person that is 5' 2" weighing 100 lbs. might register as a Comfort Index of 1. A person of this body profile may only register a very small pressure percentage change when making a movement at the higher mattress pressure levels compared to a person that is 5' 2" weighing 250 lbs. For example, if the air mattress pressure was 0.48 and an individual with a Comfort Index of 1 turned from their back to their side, it may only affect the PSI by 0.003 but an individual with a Comfort Index of 4 who moves from their back to their side may affect the PSI by 0.01. The software can adjust the operation of the various functions, including the motion sensing, increasing sensitivity for lower Comfort Indexes and decreasing sensitivity for higher comfort indexes.

Similarly, the Comfort Index numbers can be used in determining a Support Index setting that the system would recommend for the individual to begin sleeping upon first installing the bed. This Support index can be based upon the pressure reading generated from setting the Comfort Index to a predetermined value, and then having the individual lie on the mattress and press the Comfort Index to determine a pressure reading and translate it into a Comfort Index value, for example 1, 2, 3 or 4.

With no one lying on the mattress, the user can press the Comfort Index button 222. The control will cause the mattress to inflate to a predetermined pressure. The user then lies on the mattress, and the change of pressure can be measured. A signal, such as a blinking display, can indicate when the measurement process is taking place. The determined pressure differential can be used to determine a Comfort Index number (i.e. 1,2,3,4) and display that number and the word "Comfort Index" at the top of the LCD hand control area (same program that we are currently running).

For example if a Comfort Index 1 was indicated, the Support Index would blink, (e.g., for 10 seconds) the specific number, for example 20, associated with the pressure reading which would correspond to a Support Index (pressure reading) of 1 to 35=Comfort Index 1. If Comfort Index 2 was indicated, the Support Index would blink 55 for 10 seconds the specific number associated with the pressure reading which would correspond to a Support Index (pressure reading) of 35-55=Comfort Index 2. If Comfort Index 3 was indicated, the Support Index would blink, for example 70, for 10 seconds the specific number associated with the pressure reading which would correspond to a Support Index (pressure reading) of 56-75=Comfort Index 3. If Comfort Index 4 was indicated, the Support Index would blink, for example 85, for 10 seconds the specific number associated with the pressure reading which would correspond to a Support Index (pressure reading) of 76-100=Comfort Index 4

The controller 220 can also include an Ideal Support Index button 224 that operates a control whose logic is set forth in FIGS. 19A, 19B, and 19C. The Ideal Support Index button is pressed occasionally to determine what the recommended Support Index should be based upon the number of defined movements that have been recorded at various different Support Index settings. For example if the history showed the following defined movements at the associated Support Index settings a Recommendation of a setting of 65 would be recommended as this support level resulted in the fewest number of defined movements.

| Support Index setting | Average Defined movements over a 10 hour period |
| --- | --- |
| 55 | 82 |
| 65 | 48 |
| 75 | 63 |

When the Ideal Support Index button is pressed control can use some or all of the available information to determine which Support Index numbers were associated with the lowest number of Movements.

Based upon the above determination, the specific Support Index number is displayed in the Support Index area of the display 204.

The "recommended SI number" can blink for a predetermined period (e.g., 10 seconds), then return to the current SI number. Of course a different color or some other visual cue can be used to differentiate the recommended number from the current number. The air pump can be provided with a control that is programmed implement the Support Index Function. When the Support Index button is pressed for more than a predetermined time (e.g., 3 seconds) it disengages the automatic recognition function and engages the "manual mode" of movement recognition. This is done to eliminate any Non-Sleeping movements that may occur prior to going to sleep (watching TV in bed, working on the computer in bed etc.). The individual presses the Ideal Support Index button for more than 3 seconds to engage the "manual mode" of movement recognition. They fall asleep for their night's sleep and when they wake up they press the manual mode for 3 or more seconds which preferably does two things: first it disengages the manual mode and engages the auto mode of movement recognition, and second, it defines the period for when the individual was in bed and asleep.

If the Movement Recall button is pressed within 5 minutes of a second long press on the Support Index button, then only the movements recorded between the last two long presses of the Support Index button are indicated on the Movement Recall button.

The hand control(s) may be wired or wireless. The hand control (or alternatively the pump housing) may contain a CPU and RAM storage for the data accumulated (time and dates for each "activity", movements associated with each Support Index number, amount of time the individual slept, when the individual entered or exited the mattress, if a sound detector is provided amount of time spent snoring, time and direction of each adjustable base movement, time the individual went to bed each night, time the individual woke up each morning, the time restless leg syndrome began and ended, respiration rate, temperature every quarter hour, and if a moisture or humidity sensor is provided, mattress humidity.

In the preferred embodiment, the data storage would be contained within the hand control. Even if the hand control was connected to the pump housing via a wire, it could be disengaged from the wire and carried easily to a computer. The hand control would contain a USB port so that it could be connected to a computer (such as a laptop, tablet or Desktop). The data could be downloaded into the computer and formatted into a template for easier reading by the user. Alternatively the information could be transmitted (wirelessly or through the internet) to a support service that would format the data into a readable template, interpret the data (either automated using a computer, or manually), and contact the user (via phone, internet, etc.) to discuss the findings and assist the user to understand the results and how they reflect the quality (or lack of quality) sleep they recorded. The type of information they would convey would include but not limited to the following: the number of hours of sleep each night for the last 30 days (time period may vary depending on the parameters set); average number of hours of sleep for the last 30 days; the total hours of snoring each night and the average for the last 30 days; the total hours of restless leg syndrome and the average for the last 30 days; the time it took to fall asleep each night and the average for the last 30 days; the total number of times the individual left the bed during the night (e.g., to go to the bathroom). The length of time away from the mattress and the amount of time it took to fall back asleep. This could be also expressed as averages per night.

The total number of sleep hours at various Support Index Numbers, the total number of Movements at each of those support index numbers, the average number of movements per hour at each Support Index level, can all be tracked and some or all of this data can be used to make a Recommended Support Index, based on minimizing one of more of these measures, and/or based on some weighting factor or factors.

The estimated amount of Alpha, Beta, Theta and Delta sleep obtained each night and an average for the period. (this can be estimated based upon the historical scientific data on the length of the sleep stages based upon uninterrupted and interrupted sleep cycles).

Where temperature sensors are provided, bed temperature at regular periods (e.g., for each quarter hour) each night the individual slept on the mattress. The number of movements per hour per temperature could then be calculated, to determine the individual's optimum sleeping temperature.

A photo sensor could also be added to the hand control to determine the light level (e.g., in lumens) in the room. It is a popular hypothesis that higher lumen levels will cause an individual to wake up. The number of movements could also be tracked based on the lumen levels. It could then be determined if the lumen levels impact the quality of sleep as determined by the average number of movements per lumen level.

Based upon the data collected and analyzed above, various recommendations could be communicated to the user. This could be done via the hand control based upon a wireless transmission from a cloud server. It could also be communicated via a telephone conversation to translate the results to the user. It could also be communicated via email with a spreadsheet showing all the data on a daily basis, the cumulative averages and the recommendations. The recommendations may include but not limited to the following:

Temperature: studies show that movements increase and sleep quality decreases when skin temperature is above 90 degrees Fahrenheit, so recommendations of one or more of the following could be provided: increase or decrease the temperature of the room; add or subtract a heating blanket; add a mattress pad; change the pillow (assuming that may have an impact of the sleeping temperature of the individual) to one that has heat absorbing/dispersing capabilities; recommend a change of mattress or bedding (e.g., one with phase change technology (for example using micro-capsules containing paraffin are embedded in the fabric. These will liquefy when subjected to sustained heat (i.e. from the sleeper's body). The viscous paraffin will then have the ability to absorb heat.

The hand control could also be provided with the ability to send a signal to turn on a ceiling fan or to engage the HVAC system in the house to lower or increase the temperature in the bedroom.

If snoring or stilted breathing is detected, the system could recommend an adjustable base to adjust the level of the mattress to increase air flow while breathing.

Based upon the intensity, duration, number of movements per night, referral to a sleep clinic or doctor to review if a CPAP machine may be appropriate.

Studies show the optimum amount of time to fall asleep is within the 10 to 15 minute range. Those that fall asleep in 5 minutes or less are generally sleep deprived. Those that fall asleep after more than 20 minutes may have other obstacles preventing them from going to sleep (too much caffeine, difficulty relaxing, pain issues etc.).

A questionnaire could also be used to gather information (via email, phone, or directly to the hand control) asking about the individual's sleep habits/protocol/ritual/preparations/environment/exercise/diet etc. This information could reveal the cause of the difficulty in getting to sleep and/or their exhaustion level that causes them to immediately fall asleep, that could be used to make or modify recommendations resulting from the data collected and stored.

These variables could be input into the software system and recommendations made to the consumer regarding potential remediation techniques or products that can assist the individual to obtain a more restful efficient sleep.

The system records the total amount of time spent in the bed and can differentiate breathing during sleep vs. being awake so the total sleep obtain for each night can be verified. If the individual reaches a sleep state too quickly, a recommendation may be to go to bed earlier and get more hours of sleep.

The system could indicate the number of movements per hour per Support Index by temperature reading. Using this information the system, an optimum temperature and Support Index setting could be recommended. The number of adjustments and the degree of inclination provided by the power base system are indicated by the software output. This information is also compared to the movements and snoring at each inclination.

The data may indicate that the individual may optimize their sleep by starting out their sleep in a particular position (e.g., a slightly inclined position) to prevent snoring from occurring. The data may also suggest a change in the programing of the power base pre-set positions. The interpreted data would indicate which positions produced the fewest movements and the least amount of snoring.

This system may also be used by a third party who would be authorized by the user to obtain the information. For example if an adult age 50 purchased the mattress system for their aging parent(s) in their 80's who may live in another state in a retirement home or at their residence, it could provide valuable information about their care and well-being. For example, if it was noted that his/her aging father was getting up 3 or 4 times a night for only a few minutes, (presumably to go to the bathroom) it might be recommended that he see a Urologist about a prostate issue. Studies have also shown that dementia and/general disorientation may linked to sleep deprivation it would be important to have information on how many hours/per night the individual is actually sleeping. This data may also be sent directly to the nurses/doctors of the care facility to assist in the individual's care and treatment. Chronic Sleep deprivation has been linked to many health issues such as weight gain, memory loss, dementia, serotonin levels, depression, mood swings, and many diseases such as cancer. Monitoring and improving sleep quality can have a significant impact on our nation's health. This system is relatively inexpensive and can be used in home or at a health institution such as a hospital or Rest Home.

An individual's weight, sleep environment, health, sleep habits, lifestyle, allergies, bedding may vary over time and be impact the individual's quality of sleep to a greater or lesser degree. This system can have a long term connection to the user to communicate their current sleep efficiency and to recommend alternatives that will assist them to improve their sleep. The system can constantly feed information to a central server that can process the data and provide relevant feedback to the individual and/or provide the information to a Sleep Professional or someone in the medical field to review the information and provide input and recommendations to the individual. This bi-directional feedback system is meant to provide regular updates of the quality of an individual's sleep and suggestions for improvement alternatives.

The logic of other functions that underlie the measuring, displaying, and adjusting of pressure are illustrated in the Figures.

Like controller 100, controller 200 can be implemented as a wired device connected to the pressure system via a wire (not shown). Alternatively, the controller 200 can be implemented as a wireless device, with the controller wireless connected to the pressure system, for example by with a Bluetooth, Wi-Fi, ZigBee, x10, Z-Wave, radio frequency (RF), infrared or other wireless connection. The controller may even be implemented as a program (app) running on a smart phone or a tablet. In the case of a smart phone or tablet, the controls may be virtual buttons, sliders, or other types of control elements displayed on the screen of the device, which can be operated by the user. Similarly the display portion 204 of the controller 200 can be implemented by a plurality of lit, partially lit, or unlit areas on the screen of the device. Unactivated elements may be completely blank or they may be outlined or partially lit to give the user a sense of how many elements are activated and how many elements are not activated.

As the pressure in the chambers is changed, the display 204, which is preferably constructed according to the principles of this invention, for example display 50 is updated. The display 204 provides detailed feedback information to the user so that the user can better control the pressure in the chambers for maximum comfort. The display 204 provides a numerical display of the current pressure in each chamber though indicators 272, which display a numerical value for the current region or comfort index. The display 204 also provides a graphical display of the total current pressure in each chamber (through the arrays 264 of elements 266) so that the users can better visualize the pressure value and better visually interpret the pressure differences between the chambers. The display 204 also displays both a numerical and verbal cue to the level of firmness corresponding to the current pressure, through indicators 274 and 276 and a visual cue through the color coordination of the indicators 272, 274, and 276.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A display for displaying the condition of an air mattress, the display comprising a plurality of arrays of activatable elements organized in a hierarchy, each element representing a pressure increment, each array comprising a plurality of rows of a plurality of activatable elements, the rows organized in a hierarchy, the activatable elements in each array being distinctive in appearance from the activatable elements in the other arrays; and a control that operates the activatable elements to indicate a pressure value by activating an unactivated element in the lowest row of the lowest array to increase the displayed pressure value, and deactivating an activated element in the highest row of the highest array to decrease the displayed pressure value.

2. The display according to claim 1 wherein each row in an array comprises a plurality of columns, the columns organized in a hierarchy, and wherein the control operates the activatable elements to indicate a pressure value by activating the unactivated element in the lowest column of the lowest row of the lowest array to increase the displayed pressure value, and deactivating the activated element in the highest column of the highest row of the highest array to decrease the displayed pressure value.

3. The display according to claim 2 further comprising an indicator that displays a numerical value corresponding to the pressure value displayed by the activatable elements.

4. The display according to claim 3 wherein the activatable elements of each array have a unique color, and wherein the numerical value is displayed in the same color as the activatable elements in the highest array in the hierarchy which has an activated element.

5. The display according to claim 2 further comprising an indicator display that displays an alphanumeric character corresponding to the highest array in the hierarchy which has an activated element.

6. The display according to claim 5 wherein the activatable elements of each array have a unique color, and wherein the alphanumerical character is displayed in the same color as the activatable elements in highest array in the hierarchy which has an activated element.

7. The display according to claim 2 wherein each of the arrays is assigned a descriptive name, and further comprising a display that displays the descriptive name corresponding to the highest array in the hierarchy which has an activated element.

8. The display according to claim 7 wherein the activatable elements of each array have a unique color, and wherein the descriptive name is displayed in the same color as the activatable elements in the highest array in the hierarchy which has an activated element.

9. The display according to claim 2 wherein there are four arrays.

10. The display according to claim 9 wherein each array comprises five rows of five columns.

11. The display according to claim 10 wherein the color of the activatable elements in each successive row of an array is more intense than the activatable elements in the previous row of the array.

12. A controller for controlling the pressure in an air mattress, the controller comprising a plurality of controls for operating a pressure system to change the pressure in the air mattress, and at least one display according to claim 1.

13. The controller according to claim 12 adapted for controlling the pressure in each of the chambers of a multi-chamber air mattress, the controller comprising controls for operating a pressure system to change the pressure in each of the chambers of the multi-chamber air mattress, and a display according to claim 1 for each of the chambers of the multi-chamber air mattress.

14. The controller according to claim 12 adapted for controlling the pressure in each of the chambers of a multi-chamber air mattress, the controller comprising a selector for selecting one of the chambers of the multi-chamber air mattress to control and controls for operating a pressure system to change the pressure in each of the chambers of the multi-chamber air mattress, and a display according to claim 1 for each of the chambers of the multi-chamber air mattress.

* * * * *